United States Patent
Lewis et al.

(10) Patent No.: US 10,607,251 B2
(45) Date of Patent: Mar. 31, 2020

(54) SYSTEM AND METHOD FOR ISOLATED SIMULATIONS FOR ACCURATE PREDICTIONS OF COUNTERFACTUAL EVENTS

(71) Applicant: Google LLC, Mountain View, CA (US)

(72) Inventors: Randall Lewis, Mountain View, CA (US); Abdelhamid Abdou, Santa Clara, CA (US); Robert Michael Saliba, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/359,835

(22) Filed: Mar. 20, 2019

(65) Prior Publication Data
US 2019/0220887 A1    Jul. 18, 2019

Related U.S. Application Data

(63) Continuation of application No. 14/712,680, filed on May 14, 2015, now Pat. No. 10,282,745.

(51) Int. Cl.
*G06Q 30/02* (2012.01)
*G06Q 30/08* (2012.01)

(52) U.S. Cl.
CPC ..... *G06Q 30/0242* (2013.01); *G06Q 30/0244* (2013.01); *G06Q 30/0249* (2013.01);
(Continued)

(58) Field of Classification Search
None
See application file for complete search history.

(56) References Cited

U.S. PATENT DOCUMENTS

| | | |
|---|---|---|
| 6,934,748 B1 | 8/2005 | Louviere |
| 8,234,632 B1 | 7/2012 | Hugeback et al. |

(Continued)

OTHER PUBLICATIONS

'support.google.com' [online] "Google Help. Estimate your results with bid simulators" publication date unknown, [retrieved on Mar. 12, 2015] Retrieved from Internet: URL<https://support.google.com/adwords/answer/2470105?hl=en> 11 pages.

(Continued)

*Primary Examiner* — David J Stoltenberg
(74) *Attorney, Agent, or Firm* — Fish & Richardson P.C.

(57) ABSTRACT

Systems and methods of determining effectiveness of a test content item in a computer network environment are provided. A data processing system can receive a request for content from a computing device and predict a test content item as a winner of a content item auction. The data processing system can assign the computing device to a test group or a control group. The data processing system can execute the content item auction, while withholding the test content item from the auction if the computing device is assigned to the control group. The data processing system can transmit the winning content to the computing device. The data processing system can identify computer network activity associated with the test content item by the computing device. The data processing system can perform additional predictions if the computing device is the subject of additional experiments regarding additional test content items.

18 Claims, 11 Drawing Sheets

(52) U.S. Cl.
CPC ..... *G06Q 30/0275* (2013.01); *G06Q 30/0277* (2013.01); *G06Q 30/08* (2013.01)

(56) References Cited

U.S. PATENT DOCUMENTS

| | | | |
|---|---|---|---|
| 8,650,084 B2 | 2/2014 | Athey et al. | |
| 9,734,460 B1* | 8/2017 | Venkataraman | ....... G06Q 10/00 |
| 10,225,365 B1* | 3/2019 | Hotchkies | ............. H04L 67/327 |
| 2002/0078141 A1 | 6/2002 | Cohen | |
| 2005/0159921 A1 | 7/2005 | Louviere | |
| 2010/0100419 A1 | 4/2010 | Natoli | |
| 2010/0138291 A1 | 6/2010 | Silverman | |
| 2011/0040611 A1* | 2/2011 | Simmons | ........... G06Q 30/0242 |
| | | | 705/14.41 |
| 2011/0191191 A1 | 8/2011 | Bax et al. | |
| 2011/0246307 A1 | 10/2011 | Zinkevich | |
| 2011/0264516 A1 | 10/2011 | Lang | |
| 2011/0270676 A1 | 11/2011 | Vassilvitskii | |
| 2012/0005028 A1 | 1/2012 | Stone et al. | |
| 2012/0010942 A1 | 1/2012 | Bax | |
| 2012/0278158 A1 | 11/2012 | Farahat | |
| 2013/0282445 A1 | 10/2013 | Chussil | |
| 2013/0297405 A1 | 11/2013 | Farahat | |
| 2013/0325584 A1 | 12/2013 | Bogaty | |
| 2014/0040455 A1 | 2/2014 | Farahat | |
| 2014/0278981 A1* | 9/2014 | Mersov | .................. G06Q 30/02 |
| | | | 705/14.53 |
| 2014/0297398 A1 | 10/2014 | Sharifzadeh | |
| 2015/0006310 A1* | 1/2015 | Murugappan | .......... G06Q 30/08 |
| | | | 705/26.3 |
| 2015/0006311 A1* | 1/2015 | Murugappan | .......... G06Q 30/08 |
| | | | 705/26.3 |
| 2015/0019348 A1* | 1/2015 | Young-Lai | ............. H04L 67/18 |
| | | | 705/14.71 |
| 2015/0066594 A1 | 3/2015 | Li | |
| 2015/0066630 A1* | 3/2015 | Ge | ..................... G06Q 30/0255 |
| | | | 705/14.43 |
| 2015/0193815 A1 | 7/2015 | Juda | |
| 2015/0339728 A1 | 11/2015 | Sura | |
| 2015/0379566 A1* | 12/2015 | Hummel | ............ G06Q 30/0254 |
| | | | 705/14.52 |
| 2016/0155157 A1 | 6/2016 | Butler | |
| 2016/0189201 A1 | 6/2016 | Shao | |

OTHER PUBLICATIONS

Ye Chen and bo Anderson and et al. Real-Time Bidding Algorithms for Performance-Based Display Ad Allocation, 2011.

* cited by examiner

| | All Content Items | True Auction | Sim #1 | Sim #2 | Sim #3 | Sim #4 |
|---|---|---|---|---|---|---|
| Query 1, user A | {T,T,T,T,R,R} | {T,T,T,T,R,R} | {-,T,T,T,R,R} | {T,-,T,T,R,R} | {T,T,-,T,R,R} | {T,T,T,-,R,R} |
| Query 2, user B | {C,T,T,T,R,R} | {-,T,T,T,R,R} | {C,T,T,T,R,R} | {-,-,T,T,R,R} | {-,T,-,T,R,R} | {-,T,T,-,R,R} |
| Query 3, user C | {C,C,T,T,R,R} | {-,-,T,T,R,R} | {C,-,T,T,R,R} | {-,C,T,T,R,R} | {-,-,T,T,R,R} | {-,-,T,-,R,R} |
| Query 4, user D | {C,C,C,T,R,R} | {-,-,-,T,R,R} | {C,-,-,T,R,R} | {-,C,-,T,R,R} | {-,-,C,T,R,R} | {-,-,-,T,R,R} |
| Query 5, user E | {C,C,C,C,R,R} | {-,-,-,-,R,R} | {C,-,-,-,R,R} | {-,C,-,-,R,R} | {-,-,C,-,R,R} | {-,-,-,C,R,R} |

FIG. 9

SYSTEM AND METHOD FOR ISOLATED SIMULATIONS FOR ACCURATE PREDICTIONS OF COUNTERFACTUAL EVENTS

CROSS-REFERENCE TO RELATED APPLICATIONS

This application is a continuation application of, and claims priority to, U.S. patent application Ser. No. 14/712,680, titled "SYSTEM AND METHOD FOR ISOLATED SIMULATIONS FOR ACCURATE PREDICTIONS OF COUNTERFACTUAL EVENTS," filed on May 14, 2015. The disclosure of the foregoing application is incorporated herein by reference in its entirety for all purposes.

BACKGROUND

In a computer network environment such as the Internet, entities such as people or companies provide information for public display on web pages or other online documents. The online documents can include information provided by the entities via a computing device for display on the Internet. Content items can also be provided by a third-party content provider for display on the documents together with the information provided by the entities. Thus, a person viewing a document can access the information that is the subject of the document, as well as third-party content items that may or may not be related to the subject matter of the document. In some cases, the content provider may wish to determine the effectiveness of a content item in producing conversions associated with that content item.

SUMMARY

At least one aspect is directed to a computer implemented method of performing experiments on a population to measure causal effects of content items in a computer network environment. The method can include identifying a plurality of candidate content items responsive to a request for content received from a computing device, the plurality of candidate content items including a first test content item and a second test content item. The method can include generating a plurality of content items for auction from the plurality of candidate content items by removing any test content items for which the computing device is assigned to a control group. The method can include executing a content item auction on the plurality of content items for auction to determine an auction result, the auction result including a winning content item and a winning bid. The method can include identifying filter criteria based on the auction result. The method can include determining that the first test content item and the second test content item meet the filter criteria. The method can include, for a computing device in a control group with respect to the first test content item: executing a first simulation on the request and a first plurality of simulation candidate content items to determine a predicted ghost content item, the first plurality of simulation candidate content items generated by removing from the plurality of candidate content items any candidate content items not meeting the filter criteria. The method can include, for a computing device in a treatment group with respect to the first test content item: executing a second simulation on the request and a second plurality of simulation candidate content items to determine a predicted winning content item, the second plurality of simulation candidate content items generated by removing from the plurality of candidate content items any test content items for which the computing device is assigned to a control group and any candidate content items not meeting the filter criteria. The method can include, for a computing device in the treatment group with respect to the first test content item: executing a third simulation on the request and a third plurality of simulation candidate content items to determine a predicted absent ghost content item, the third plurality of simulation candidate content items generated by removing from the plurality of candidate content items the first test content item and any candidate content items not meeting the filter criteria. The method can include logging, in a persistent data store, the auction result, the predicted ghost content item, the predicted winning content item, and the predicted absent ghost content item. The method can include delivering, to the computing device, the winning content item. The method can include identifying network activity associated with the winning content item subsequent to delivery.

At least one aspect is directed to a system for performing experiments on a population to measure causal effects of content items in a computer network environment. The system can include a data processing system having one or more processors. The system can identify a plurality of candidate content items responsive to a request for content received from a computing device, the plurality of candidate content items including a first test content item and a second test content item. The system can generate a plurality of content items for auction from the plurality of candidate content items by removing any test content items for which the computing device is assigned to a control group. The system can execute a content item auction on the plurality of content items for auction to determine an auction result, the auction result including a winning content item and a winning bid. The system can identify filter criteria based on the auction result. The system can determine that the first test content item and the second test content item meet the filter criteria. The system can, for a computing device in a control group with respect to the first test content item: execute a first simulation on the request and a first plurality of simulation candidate content items to determine a predicted ghost content item, the first plurality of simulation candidate content items generated by removing from the plurality of candidate content items any candidate content items not meeting the filter criteria. The system can, for a computing device in a treatment group with respect to the first test content item: execute a second simulation on the request and a second plurality of simulation candidate content items to determine a predicted winning content item, the second plurality of simulation candidate content items generated by removing from the plurality of candidate content items any test content items for which the computing device is assigned to a control group and any candidate content items not meeting the filter criteria. The system can, for a computing device in a treatment group with respect to the first test content item: execute a third simulation on the request and a third plurality of simulation candidate content items to determine a predicted absent ghost content item, the third plurality of simulation candidate content items generated by removing from the plurality of candidate content items the first test content item and any candidate content items not meeting the filter criteria. The system can log, in a persistent data store, the auction result, the predicted ghost content item, the predicted winning content item, and the predicted absent ghost content item. The system can deliver, to the computing device, the winning content item. The system can identify network activity associated with the winning content item subsequent to delivery.

At least one aspect is directed to a computer readable storage medium storing instructions that, when executed by one or more data processors, cause the one or more data processors to perform operations. The operations can include identifying, by a data processing system, a plurality of candidate content items responsive to a request for content received from a computing device, the plurality of candidate content items including a first test content item and a second test content item. The operations can include generating a plurality of content items for auction from the plurality of candidate content items by removing any test content items for which the computing device is assigned to a control group. The operations can include executing, by the data processing system, a content item auction on the plurality of content items for auction to determine an auction result, the auction result including a winning content item and a winning bid. The operations can include identifying, by the data processing system, filter criteria based on the auction result. The operations can include determining that the first test content item and the second test content item meet the filter criteria. The operations can include for a computing device in a control group with respect to the first test content item: executing, by the data processing system, a first simulation on the request and a first plurality of simulation candidate content items to determine a predicted ghost content item, the first plurality of simulation candidate content items generated by removing from the plurality of candidate content items any candidate content items not meeting the filter criteria. The operations can include for a computing device in a treatment group with respect to the first test content item: executing, by the data processing system, a second simulation on the request and a second plurality of simulation candidate content items to determine a predicted winning content item, the second plurality of simulation candidate content items generated by removing from the plurality of candidate content items any test content items for which the computing device is assigned to a control group and any candidate content items not meeting the filter criteria. The operations can include for a computing device in a treatment group with respect to the first test content item: executing, by the data processing system, a third simulation on the request and a third plurality of simulation candidate content items to determine a predicted absent ghost content item, the third plurality of simulation candidate content items generated by removing from the plurality of candidate content items the first test content item and any candidate content items not meeting the filter criteria. The operations can include logging, in a persistent data store, the auction result, the predicted ghost content item, the predicted winning content item, and the predicted absent ghost content item. The operations can include delivering, to the computing device, the winning content item. The operations can include identifying, by the data processing system, network activity associated with the winning content item subsequent to delivery.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 9 is a table describing isolated simulations for accurate predictions of counterfactual events, according to an illustrative implementation.

DETAILED DESCRIPTION

Figure 1:
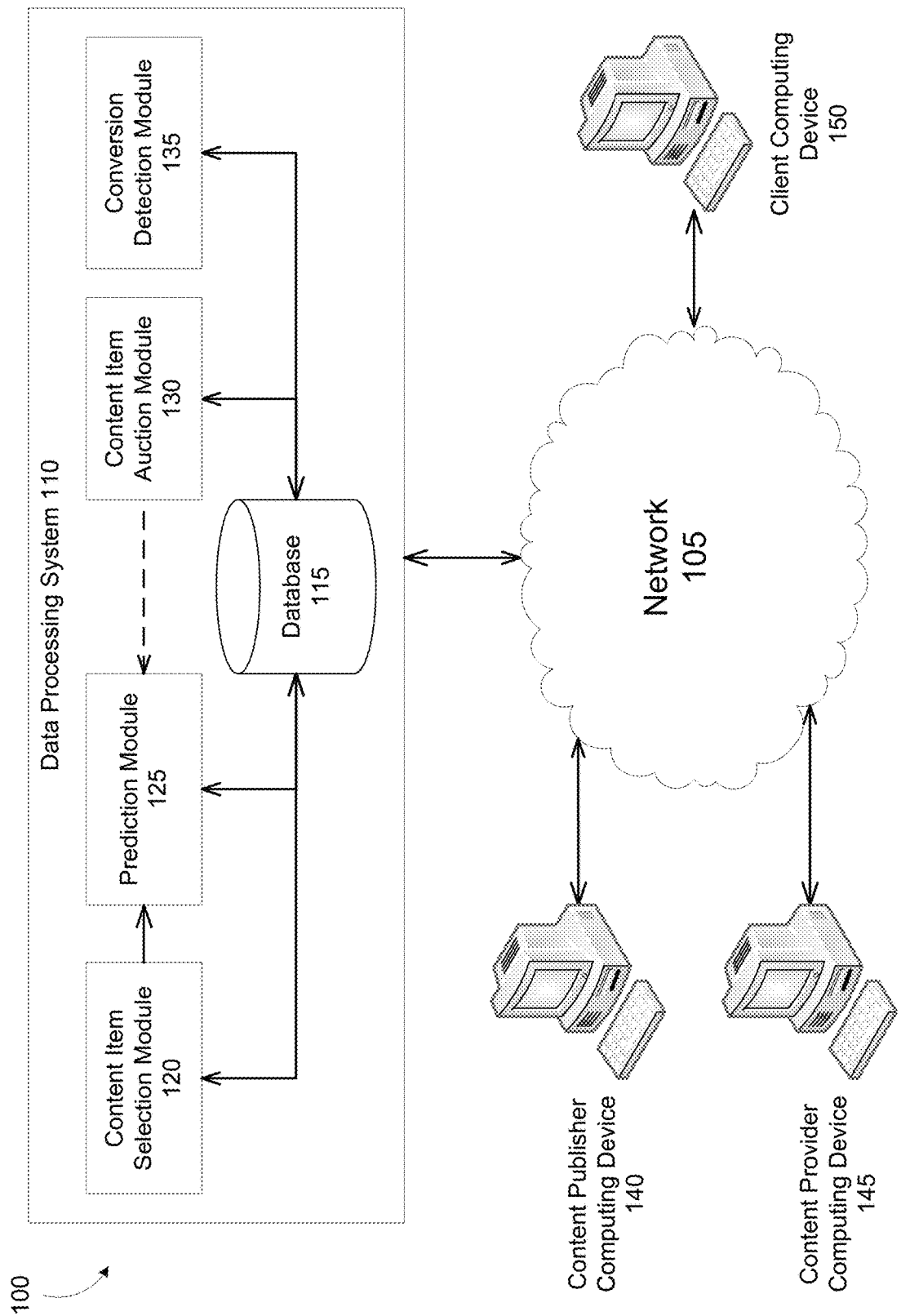
FIG. 1 is a block diagram depicting an example environment for determining the effectiveness of content items in a computer network environment, according to an illustrative implementation.

Following below are more detailed descriptions of various concepts related to, and implementations of, methods, apparatus, and systems determining effectiveness of a displayed content item in generating conversions. The various concepts introduced above and discussed in greater detail below may be implemented in any of numerous ways, as the described concepts are not limited to any particular manner of implementation.

Systems and methods of the present disclosure relate generally to determining effectiveness of content items in a computer network environment. For example, a client computing device such as a personal computer, smartphone, or tablet can visit a web page (or other online document) maintained by a content publisher. The content publisher may include in the online document a slot for the display of a content item, such as an advertisement, produced by a content provider. A data processing system associated with the content provider can receive the request for content, and provide a content item to be displayed in the slot. In some cases, the content provider may wish to determine the effectiveness of a test content item in producing conversions associated with that content item. In such cases, the data processing system can be configured to selectively provide the test content item, or an alternate content item of similar relevance to the request, for display to the client computing device. The data processing system can measure the resulting difference in subsequent conversions between client computing devices that received the test content item or the alternate content item.

To improve the accuracy and usefulness of measurements, the data processing system can employ predictions to ensure that client computing devices are properly chosen for measurement. In a typical scientific experiment, client computing devices are chosen, assigned to test or control group, subjected to an experimental variable that differs between the groups, and observed for expression of a responding variable. Behavioral experiments, such as measuring the effectiveness of an advertisement in generating conversions, can be fraught with difficulties caused by noise and bias. Noise can obscure the results of an experiment if the population is picked randomly, and includes a large number of client computing devices that the advertiser would not have targeted in a real advertising campaign. Similarly, bias can skew the results of an experiment if client computing devices are not assigned randomly to a test or control group. For example, in a population where some client computing devices were targeted for advertising while others were not, using those two groups as the test and control groups will introduce bias into the result because the client computing devices were not assigned randomly, but based on the advertiser's belief as to which client computing devices would respond to the advertisement. The resulting measurement may overestimate the effectiveness of the advertisement among a population limited to client computing devices the advertiser would wish to target. By choosing client computing devices for an experiment based on a prediction of who would see the content item, however, the data processing system can eliminate much of the noise and bias described above.

In a typical experiment, the data processing system can identify a plurality of candidate content items responsive to a request for content received from a client computing device, predict a content item as the winner of a content item auction (the so-called "ghost" content item), assign the client computing device to a control group, remove the ghost content item from the plurality of candidate items, execute the content item auction to identify a content item for display from among the plurality of content items, transmit the content item for display to the client computing device, and identify computer network activity associated with the ghost content item by the client computing device. The data processing system can further identify a second plurality of candidate content items responsive to a second request for content received from a second client computing device, predict the ghost content item as the winner of a second content item auction, assign the second client computing device to a test group, execute a second content item auction to identify a second content item for display, transmit the second content item for display to the second client computing device, and identify computer network activity associated with the ghost content item by the second client computing device.

In the example above, the data processing system can predict that a content item will win a content item auction. This content item becomes the ghost content item. For a client computing device assigned to a control group, the ghost content item is withheld from consideration in the content item auction, and thus should not be transmitted to the computing device. For a second client computing device assigned to a test group, the ghost content item remains in consideration in the second content item auction, and thus may—but is not guaranteed to—be transmitted to the second client computing device. In both cases, however, because the ghost content item was predicted as the winner of the content item auction, the client computing device is appropriate for measurement.

These implementations can offer content providers a more cost-effective way to conduct experiments. Because the prediction can be separate from the content item auction, the content provider need not pay for the transmission of content items other than the ghost content item. That is, the content provider need not pay for providing a content item to a client computing device assigned to the control group because presumably the provider of the content item that won the content item auction paid for the transmission. Similarly, the content provider need not pay when a content item other than the ghost content item wins the auction for a client computing device in the test group.

In addition, these implementations are robust to downstream effects such as rejections of content items by content publishers, rendering errors, latency, logging errors, and the like. Any such downstream effects will affect both the test and control groups more or less symmetrically, and thus should not skew results. Results yielded by these implementations can be more useful to an advertiser because they give the advertiser a measurement of causal lift—the increased number of conversions due to the content item—that relates back to a decision point: the advertiser's decision to enter a bid in an auction the advertiser is likely to win.

The data processing system can make the prediction at any time; the prediction does not have to occur between receiving a request for content and transmitting a content item for display. In implementations where the data processing system makes the prediction before receiving a request for content, it can use a prediction model, historical data, or combination of the two. In some implementations, the data processing system can use a prediction model to select a winner for each plausible combination of input data, and store a data array of hypothetical requests and predicted content item auction winners in the database. The prediction model can be prepared with the parameters of the content item auction to yield an expected winner based on information including request data, data related to candidate content items, and bid constraints. The prediction model can select a winner for each plausible combination of input data, and store the list of winners in the database. When the data processing system receives a request for content, it can access the data array in the database and retrieve the predicted winner. In some implementations, the data processing system can use historical data to predict a winner for each plausible combination of input data. For example, one day's worth of requests may number into the thousands or millions spanning a large proportion of all possible combinations of input data. The data processing system can combine this request data, along with the associated content item auction outcomes, to generate a large table of predicted auction winners based on the data received. It can then store this list in the database for later retrieval.

Implementations in which the data processing system makes the prediction after transmitting the content item for display can operate similarly to the pre-request implementations described above. The data processing system can use a prediction model, historical data, or combination of the two. The data processing system can assign each request from a list of stored requests into a test group and a control group based on a random, pseudo-random, or arbitrary model. The data processing system can analyze the stored requests and predict a winner of a content item auction for each. The data processing system can use the predictions to divide the requests in the test group and the control group into two additional groups: predicted exposure and no predicted exposure. The data processing system can measure conversions associated with the ghost content item for each of the four groups. The data processing system can achieve a less noisy measurement of the ghost content item's effectiveness by measuring conversions in only the predicted exposure test and control groups.

Predictions made after the fact in this manner can require less processing power, which can amount to a significant benefit when multiplied over thousands or millions of simulations. Because the results of the content item auction are already known, the data processing system can analyze the results and use them to set boundaries for the prediction model. These boundaries may allow a simulation executed by the prediction model to converge more quickly, reducing the processing resources required. When multiplied over thousands or millions of simulations, the benefit can be substantial. In addition, if the content item auction gave the ghost content item a low rank, indicating a very low probability of winning a simulation, the data processing system can default to a no-predicted-exposure assignment of the computing device without running the simulation, saving further processing resources with negligible effect on the accuracy of subsequent measurements.

The systems and methods described herein do not require that the predictions be perfectly accurate. In fact, even if the data processing system correctly predicts the content item auction winner half the time, it can still remove a significant amount of noise from a measurement. It is important to note, however, that incorrect predictions can fall into two categories, each having a different effect on the measurement. Over-predictions occur when the data processing system incorrectly predicts that the ghost content item will win the content item auction. Such predictions result in adding client computing devices to the experimental population even though the ghost content item would not have won the content item auction. This can add noise to the measurement, but should not introduce bias because conversions measured from the over-predictions should be distributed proportionally between the test and control groups.

More problematic, however, are under-predictions caused by incorrectly predicting that a ghost content item would not have won a content item auction. In the under-predictions, more conversions would have been measured in the test group than the control group due to the causal lift caused by the ghost content item. Therefore, not measuring conversions from the under-predictions removes conversions from the test and control groups disproportionally, introducing a bias that can result in a measurement that suggests the ghost content item is less effective at producing conversions than it actually is.

Other biases can be introduced by using information in the prediction that applies asymmetrically to the test and control groups. For example, it may be possible to determine viewability information for a content item; that is, whether the content item actually appeared on the screen of a client computing device. The data processing system may or may not be able to collect this information equally from the test group and control group, respectively. While the data processing system can employ a tracking pixel to verify that the content item appeared on screen of a client computing device in the test group, the data processing system may or may not have the same visibility for an alternate content item sent to a client computing device in the control group. In some cases, the viewability information may be symmetric between test and control groups. In some cases, the viewability information may be asymmetric; for example, in the test group it may take only 5 seconds to render the content item before collecting viewability information while in the control group it may take 15 seconds. In other cases, it may not be possible to collect viewability information for a content item delivered to a client computing device in the control group at all. Thus the result of including such appearance-on-screen information may tend to affect measurements from the test and control groups asymmetrically, resulting in a bias that may overestimate content item effectiveness. Other factors that could introduce bias include information about whether the transmitted content item rendered properly on a browser of the computing device, or whether the content publisher hosting the content item rejected the ghost content item (for example, due to a prohibition on hosting advertisements from the content provider of the ghost content item). Within the test group, if a content publisher rejects the ghost content item, a different content item will be displayed to the client computing device, effectively zeroing the experimental variable. Within the control group, however, if the content publisher rejects the alternate content item, the experimental variable remains unchanged; that is, the client computing device still receives a relevant content item other than the ghost content item. Thus, adjusting for rejection of the content item by the content publisher will unequally remove measurements from the test and control groups, respectively, thereby contributing bias to the measurement. These are examples of asymmetrically collected data whose use could introduce bias into the measurement; however, that does not mean that it would not be possible to model publisher rejection or appearance tracking in a symmetric manner.

In some implementations, including experiments run on historical request, auction, and conversion data, it may be beneficial to take into account the timing of exposure and conversion events. For example, if a client computing device executes a conversion before a content item was selected for delivery, there can be no possible causal link between the content item and the conversion. Including this conversion in the measurement would add noise and reduce statistical precision. If timing is taken into account, however, conversions that could not have resulted from content item exposures can be excluded from the measurement. It may be similarly beneficial to exclude conversions that resulted within a short period of time from the exposure. It may be highly unlikely that a conversion occurring fewer than 10-30 seconds after an exposure bears any causal relationship to that exposure; therefore, such conversions can safely be excluded from the measurement. As with any other information taken into account in the measurement, however, exposure and conversion timing information must be collected and applied symmetrically to the test group and control group. That means that even in the control group, conversions should only be measured if they follow exposure to the content item, even though the content item provided to the control group may bear no relation to the conversion.

The systems and methods disclosed herein can also facilitate running more cost-effective experiments, and running multiple experiments on the same sample population. In traditional experiments of this sort, the cost to content providers generally depends on population size. That is, if a test group contains 50 client computing devices and a control group contains 50 client computing devices, the cost to the content provider may be based on a population size of 100, even though only 50 client computing devices are exposed to the content provider's content item. Content providers thus prefer to run experiments on populations divided such that 90% of the client computing devices are assigned to the test group and 10% are assigned to the control group. In this manner, the content provider can realize a possible 90% exposure rate for its cost. Using the systems and methods disclosed herein, however, the cost to the content provider may depend only on the size of the test group, making the control group essentially cost free. The content provider can thus run an experiment with a 10/90 split; that is 10% of the client computing devices are assigned to the test group and 90% are assigned to the control group. Statistically speaking, measurements from a 90/10 test/control distribution should be equally meaningful to measurements from a 10/90 distribution, yet the experiment may only require one ninth of the cost. Using a 10/90 distribution can also allow for a greater variety of experiment strategies. For example, a content provider may wish to run a tiered experiment where several different content items are tested within the same population to see which is more effective, launch a campaign based on the most effective content item, and follow up with an ongoing monitoring experiment. A content provider can run three experiments using three different content items by employing a 10/10/10/70 test(a)/test(b)/test(c)/control distribution. The content provider can select the most effective content item to roll out in the campaign. The content provider can continuously monitor the effectiveness of the content item by serving the chosen content item to 90% of the population, thereby reaching 90% of its target audience while retaining 10% of the population as a control group. In this manner, the content provider can measure the long-term effects of the campaign, and ensure the accountability of content publishers.

The systems and methods disclosed herein can address problems arising from running multiple experiments on the same data set, and from running experiments that include multi-slotted, multi-unit, or whole-page auctions. In the 10/10/10/70 example described above, each experiment is run on a discrete segment of the population; that is, each client computing device in the population will be subject to only a single experiment. But in some situations, it may be desirable to run multiple experiments on the whole population. In such cases, each client computing device in the population will be subject to multiple experiments. Accordingly, each computing device's assignment to a test or control group for each experiment will be independently randomized; that is, each computing device's group assignment with regard a first test content item will have no correlation to the computing device's group assignment with regard to a second test content item, etc. Collecting meaningful data from such experiments becomes problematic when the experiments have inputs that interact. For example, if three different content providers each provide a different test content item, and more than one of those test content items is relevant to a request from a client computing device, the simulator will only declare one winner even though an unbiased measurement requires knowing the counterfactual for each of the three test content items. If the winner of the auction is dependent on the participants, and multiple content items are withheld, the simulator may not accurately predict which content item would have won the auction had only that test content item been withheld. We would thus lack an accurate counterfactual for any of the experiments.

The system thus needs to run multiple types of simulations (one per bucket) or separate simulations (isolated simulations for each experiment). Doing so, however, can increase computational cost of experiments as the number of simulations would equal the number of experiments times the number of buckets for each event. The system can reduce the computational cost of the simulations by implementing filtering. For example, if the "real" event (e.g., a real auction for ad delivery) occurs before the simulation, the result of the real event can be used to bound subsequent simulations and restrict the participants in the simulation to only those candidate content items that would have had a reasonable chance of winning the real event. Furthermore, subsequent simulations can be dispensed with if the results of a preceding simulation or the real event indicate that the result of the subsequent simulations will not yield useful information.

In many cases the experiment may not affect the outcome of the simulation. In such cases, computational cost can be reduced by running the real event first, running the primary "first" simulation, and conditioning whether to run additional simulations on the outcome of the first simulation. This reduces computational costs by running only a subset of simulations where the experiment's state/bucket is expected to influence the simulator's results, while eliminating the errors that would result from running only a single prediction for the entire marketplace. In addition, the results of the real event can be used to bound subsequent simulations to further reduce the computational cost. For example, the simulator can disregard any candidate content item that could not have won a real auction because the maximum bid amount corresponding to that candidate content item was less than the winning bid.

FIG. 1 is a block diagram depicting an example environment 100 for determining the effectiveness of content items in a computer network environment, according to an illustrative implementation. The environment 100 includes a data processing system 110 that can interface with a content publisher computing device 140, a content provider computing device 145, and a client computing device 150 via a network 105. The data processing system 110 can include a database 115, a content item selection module 120, a prediction module 125, a content item auction module 130, and a conversion detection module 135.

The content publisher computing device 140 can publish online documents, such as web sites, for viewing and use by client computing devices 150. The content publishing computing device 140 can provide a space, or "slot," in an online document. A content provider computing device 145 can provide a content item for display in the slot. When the client computing device 150 loads the online document, it sends a request to the content publisher computing device 140 or the data processing system 110 for a content item to display in the slot. The content publisher computing device 140, the data processing system 110, or the content provider computing device 145 can provide the content item for display in the online document.

The content provider computing device 145 can provide content items, such as advertisements, for display in a website or other online document. A client computing device 150 can load an online document provided by a content publisher computing device 140. The content publisher computing device 140 can provide a slot for display of a content item in the web page. When the client computing device 150 loads the online document, it sends a request, either directly or via the content publisher computing device 140, to the data processing system 110 for a content item to display in the slot on the online document. The data processing system 110 can transmit a content item received from the content provider computing device 145 to the client computing device 150 in response to the request. In some implementations, the data processing system 110 can cause the content item to be transmitted from the content provider computing device 145, or another computing device associated with the content provider.

The client computing device 150 can be used to perform computing operations including viewing online documents via the network 105. The client computing device 150 can be a personal computer, smartphone, tablet, or the like. It can view online documents via a web browser or other application including a dedicated social media or shopping application. Online documents may have one or more slots for the display of content items provided by a third party. When the client computing device 150 loads an online document, it can transmit a request to the data processing system 110 to provide a content item for display in the slot. The data processing system 110 can identify a content item for display by the client computing device 150. The client computing device 150 can receive the content item from the data processing system 110, the content provider computing device 145, or another computing device associated with the content provider. The client computing device 150 can render the content item with the online document, and display them on a screen of the client computing device 150.

The data processing system 110 includes a database 115. The database 115 stores content items provided by the content provider computing device. The database 115 can be implemented as a database or other data structure residing on a computer-accessible storage medium such as a hard drive, optical drive, solid-state drive, cloud storage, or the like. The database 115 can supply content items to the content item selection module 120, the prediction module 125, and the content item auction module 130. The data processing system 110 can provide the content items in the database 115 to the client computing device 150 based on a request from the client computing device 150. The database 115 can store historical data such as requests and content item auction winners. The database 115 can store identifiers for use by the conversion detection module 135 in linking requests, content item auction winners, and conversions. It can also store instructions that cause the data processing system 110 to execute the operations of the systems and methods described herein.

The data processing system 110 includes a content item selection module 120. The content item selection module 120 can identify a plurality of candidate content items stored in the database 115 that are responsive to a request. The content item selection module 120 can determine the relevance of content items based on information in the request, a query sent by the client computing device 150, one or more keywords associated with the online document, or information about the client computing device 150. The content item selection module 120 can store the candidate content items in the database 115. Alternatively, the content item selection module can store identifiers of the candidate content items in database 115. The content item selection module 120 can make these candidate content items or identifiers available to the prediction module 125 and to the content item auction module 130.

The data processing system 110 includes a prediction module 125. The prediction module 125 can identify, from the list of candidate content items determined by the content item selection module 120, a content item likely to win a content item auction and thus be provided to the client computing device 150 in response to a request. This content item is called the "ghost" content item. The prediction module 125 can identify the ghost content item based on a prediction model, historical data, or combination of the two. The prediction module 125 can use the prediction model to execute a simulation, such as a simulated auction. The prediction module 125 can factor in some or all of the data used to judge the relevance of the candidate content items to the request from the client computing device 150, and can additionally factor in expected bids and bid constraints from one or more content provider computing devices 145 seeking to have their respective content items sent to the client computing device 150. The prediction can give the data processing system 110 a reasonably good guess for which content item of the plurality of content items is likely to win a content item auction, and thus be chosen to be sent to the client computing device 150 in response to the request. In some implementations, the prediction module 125 can make a prediction "online" as described above; that is, the prediction module 125 can make the prediction after the data processing system 110 receives the request from the client computing device 150 but before the data processing system 110 transmits a content item for display on the client computing device 150. In some implementations, the prediction module 125 can make predictions "offline," either before the client computing device 150 sends a request, or after the data processing system 110 transmits a content item for display to the client computing device 150.

In some implementations, the prediction module 125 can make a prediction before the client computing device 150 sends a request. In such implementations, the prediction module 125 can use historical request/auction winner data and information about the parameters of the content item auction to predict a content item auction winner based on a hypothetical request. In some implementations, the prediction module 125 can use a prediction model to select a winner for each plausible combination of input data, and store a data array of hypothetical requests and predicted content item auction winners in the database 115. The prediction model can be prepared with the parameters of the content item auction to yield an expected winner based on information including request data, data related to candidate content items, and bid constraints. The prediction model can select a winner for each plausible combination of input data, and store the list of winners in the database 115. When the data processing system 110 receives a request for content, it can access the data array in the database 115 and retrieve the predicted winner. In some implementations, the data processing system 110 can use historical data to predict a winner for each plausible combination of input data. For example, one day's worth of requests may number into the thousands or millions spanning a large proportion of all possible combinations of input data. The data processing system 110 can combine this request data, along with the associated content item auction outcomes, to generate a data array of hypothetical requests and predicted content item auction winners, and store the data array in the database 115. When the data processing system 110 receives a request, it can identify the ghost content item by retrieving the predicted content item auction winner from the data array in the database 115.

In implementations where the prediction module 125 makes a prediction after the data processing system 110 transmits a content item for display to the client computing device 150, the prediction module 125 can use information from the content item auction module 130 about the content item auction to set boundaries for a simulation to predict the content item auction winner. Providing boundaries may allow the simulation to converge more quickly, reducing the processing resources required. When multiplied over thousands or millions of simulations, the benefit can be substantial. In addition, if the content item auction gave the ghost content item a low rank, indicating a very low probability of winning a simulation, the data processing system can default to a no-predicted-exposure assignment of the computing device without running the simulation, saving further processing resources with negligible effect on the accuracy of subsequent measurements.

The prediction module 125 need not be 100% accurate in predicting the winner of auctions. As discussed further below, even a prediction module 125 that achieves 50% accuracy, or even less, can still provide effective noise filtering for measurements of content item effectiveness without introducing bias or other detrimental error. Nor does the prediction module 125 require access to every available type of data related to the request, the content item auction, or content item delivery. The prediction module 125 should, however, only take into account information that it can collect symmetrically from both a test group and a control group so as to avoid introducing bias into the measurement of a content item's effectiveness.

The data processing system 110 includes a content item auction module 130. The content item auction module 130 can receive bids and bid parameters from content provider computing devices 145 to determine which content item will be provided for display by the client computing device 150. For example, the content item auction module 130 may conduct a content item auction in response to a client computing device 150 request for a content item to display in a slot in an online document. The content item auction module 130 may use any number of factors to determine the winner of the content item auction. For example, the winner of a content auction may be based in part on the third-party content provider's bid and/or a quality score for the third-party provider's content (for example, a measure of how likely the client computing device 150 is to execute a click on the content). In other words, the highest bidder may not necessarily win a content auction. The process by which the content item auction module 130 selects a content item to display does not have to meet a rigid definition of an auction. The content item auction module 130 need only perform some kind of ranking operation to choose a content item for display from among a list of candidate content items.

The content item auction module 130 can be configured to allow third-party content providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at client computing devices 150. In some implementations, the bid amount may be on a cost per impression or cost per thousand impressions (CPM) basis. In further implementations, a bid amount may correspond to a specified action being performed in response to the third-party content being presented at a client computing device 150. For example, a bid amount may be a monetary amount that the third-party content provider is willing to pay, should their content be clicked on at the client device, thereby redirecting the client device to the provider's webpage or another resource associated with the content provider. In other words, a bid amount may be a cost per click (CPC) bid amount. In another example, the bid amount may correspond to an action being performed on the third-party provider's web site, such as the client computing device 150 executing a purchase. Such bids are typically referred to as being on a cost per acquisition (CPA) or cost per conversion basis.

The content item auction module 130 can also take into account selection parameters provided by the content provider computing device 145 that control when a bid is placed on behalf of a third-party content provider. If the third-party content is to be presented in conjunction with search results from a search engine, for example, the selection parameters may include one or more sets of search terms or keywords. For instance, the third-party content provider may only participate in content auctions in which a search query for "flights to Tahiti" is sent to a search engine. Other illustrative parameters that control when a bid is placed on behalf of a third-party content provider may include, but are not limited to, a topic identified in the client computing device's 150 historical viewing data, the topic of a first-party online document with which the third-party content is to be presented, a geographic location of the client computing device 150, or a geographic location specified in a search query. In some cases, a selection parameter may designate a specific webpage, website, or group of websites with which the third-party content is to be presented. For example, an advertiser selling golf equipment may bid to place an advertisement on the sports page of a particular online newspaper.

The content item auction module 130 can conduct an auction among the content items present in the list of candidate content items identified by the content item selection module 120. In some implementations, a content provider may wish to measure the effectiveness of one of its content items in generating conversions such as clicks on the content item and/or subsequent sales. To ensure that the measurement is as meaningful as possible, the content provider may wish to measure causal lift among a group of client computing devices 150 selected for exposure to the content item versus an appropriate counterfactual. An appropriate counterfactual would include a group of client computing devices 150 for whom the ad would have been both relevant and likely to win a content item auction. A measurement simply between client computing devices 150 selected for exposure to the content item versus client computing devices 150 not exposed to the content item may suffer from bias because client computing devices 150 not exposed to the content item do not represent a true counterfactual. That is, the content item may have been irrelevant to many of the unexposed client computing devices 150, or the client computing devices 150 may not have been part of a group targeted by the content provider. Thus, the prediction module 125 can not only select a content item likely to win a content item auction, it can also indicate that the client computing devices 150 is one to whom that content item is particularly relevant. Therefore, comparing the number of conversions between client computing devices 150 selected for exposure versus client computing devices 150 who would have been exposed can yield a meaningful measure of the content item's effectiveness.

To perform such an experiment, the data processing system 110 can assign the client computing device into a test group or a control group based on a random, pseudo-random, or arbitrary model. In some implementations, the data processing system 110 can make the assignment base on, for example, a cookie or other identifier on the client computing device 150. The data processing system 110 can randomize the client computing devices 150 by applying a hash function to the identifier to generate a uniform random number. The data processing system 110 can then take the last two or three digits of the generated number, and assign the client computing device 150 to a test group or a control group based on whether those digits are above or below a predetermined threshold. The threshold can be set to produce a desired test/control group ratio for the particular experiment; for example, 50/50, 90/10, 10/90, etc. In some implementations, the data processing system 110 can make assignments based on identifiers that may not be unique to a client computing device 150, but may still yield results granular enough to be useful; such as a five- or nine-digit zip code. The assignment should be random; however, the identifier can be used to ensure that a particular client computing device 150 is consistently assigned to the test or control group such that all requests, ghost content item predictions, content item auction winners, and conversions are all counted toward the correct group. A variety of group assignment models can be used, as long as assignment is made on information unrelated to a conversion decision. For example, assigning a client computing device 150 to a test or control group depending on whether the request was made during an even or odd second of the day would yield acceptable results. In contrast, making assignment depending on whether the request was made between midnight and noon, or noon and midnight, may divide the population up into groups with different purchasing behaviors, which may lead to misleading measurements of content item effectiveness.

For a client computing device 150 assigned to the test group by the data processing system 110, the ghost content item identified by the prediction module 125 is retained in the list of candidate content items identified by the content item selection module 120. The ghost content item will be included in the content item auction performed by the content item auction module 130. Based on the accuracy of the prediction module 125, the ghost content item may be likely to win the content item auction, and thus be transmitted for display by the client computing device 150. The conversion detection module 135 can identify subsequent computer network activity associated with the ghost content item by client computing devices 150.

For a client computing device 150 assigned to the control group by the data processing system 110, the ghost content item identified by the prediction module 125 is removed from the list of candidate content items identified by the content item selection module 120. When the content item auction is performed by content item auction module 130, a different content item will win and be transmitted for display by the client computing device 150. The conversion detection module 135 can identify subsequent computer network activity associated with the ghost content item by client computing devices 150.

The data processing system 110 includes a conversion detection module 135. The conversion detection module 135 can identify computer network activity of the client computing device 150 to detect conversions associated with the content item. For example, the conversion detection module 135 can identify, via the network 105, an online conversion executed on the client computing device 150 into an input or interface of an online document. The online conversion can be a click, an item added to an online shopping cart, or an online purchase. The online conversion could include any other type of detectable online behavior including a mouse over or a scroll over. The online conversion can represent an interaction between the client computing device 150 and the content provided by the content provider computing device 145. The content can be an advertisement, link, embedded video, a Flash object, banner, pop-up, pixel, or any combination thereof.

The conversion detection module 135 can link the detected conversion back to the client computing device 150. In some implementations, the conversion detection module 135 can link a computing device that executed a conversion with a computing device that transmitted a request for content by matching the cookies on each. For example, when a request is sent and a content item is displayed, the content item may contain a pixel that executes a script that reads a cookie and transmits the cookie information to the data processing system 110. Similarly, a purchase confirmation page displayed on a web site associated with the content provider may carry a similar pixel. Thus the conversion detection module 135 can link the purchase associated with the content item to the display of the content item based on the cookie data read by the script in each instance.

Figure 2:
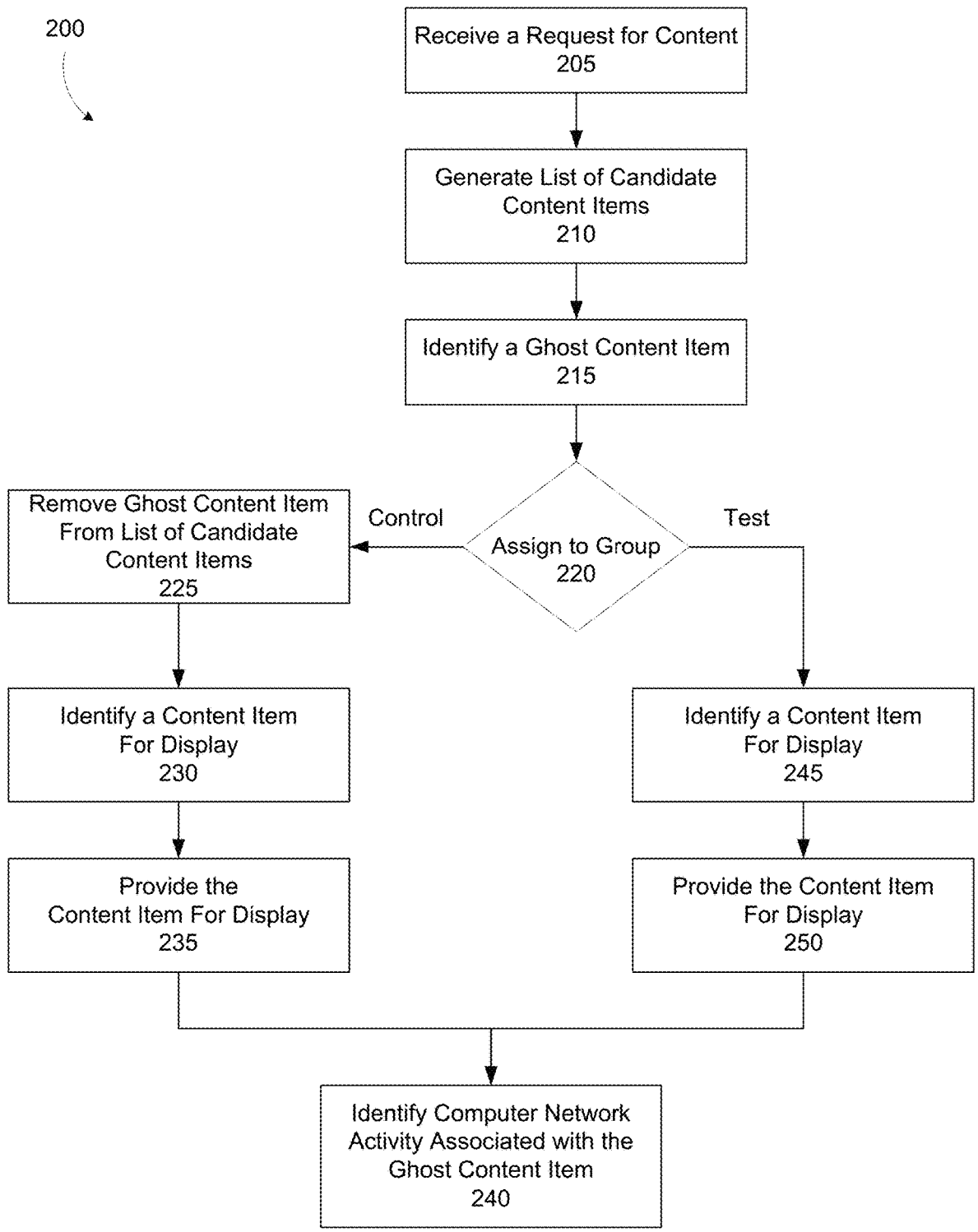
FIG. 2 is a flow diagram depicting an example method for determining the effectiveness of content items in a computer network environment, according to an illustrative implementation.

FIG. 2 is a flow diagram depicting an example method 200 for determining the effectiveness of content items in a computer network environment, according to an illustrative implementation. The method 200 can receive a request for content from a client computing device 150 (ACT 205). The method 200 can generate a list of candidate content items responsive to the request (ACT 210). The method 200 can identify a ghost content item as the predicted winner of a content item auction (ACT 215). The method 200 can assign the client computing device 150 to a test group or a control group (ACT 220). For a client computing device 150 assigned to the control group, the method 200 can remove the ghost content item from the list of candidate content items (ACT 225). The method 200 can execute a content item auction to identify a content item for display (ACT 230). The method 200 can transmit the content item for display to the client computing device 150 (ACT 235). The method 200 can identify computer network activity associated with the ghost content item by the client computing device 150 (ACT 240).

The method 200 can receive a request for content from a client computing device 150 (ACT 205). When the client computing device 150 loads an online document provided by a content publisher computing device 140, the online document may have a slot for the display of a content item. The client computing device 150 can transmit a request for a content item to display in the slot. The request can include data indicating a device identifier for the client computing device 150 and/or additional information such as the online document, the referring page, a keyword, or query that preceded the client computing device 150 loading the online document. The data processing system 110 can receive this request via the network 105.

The method 200 can generate a list of candidate content items responsive to the request (ACT 210). The content item selection module 120 can use information included with the request to generate a list of candidate content items. Candidate content items can be items that are responsive to the request. Responsive content items may include content items associated with the keyword, the query, or topics addressed in the online document. Candidate content items may also include content items with which a content item provider would like to target the client computing device 150; for example, advertisements the content provider believes would be relevant to a user of the client computing device 150. The content item selection module 120 can store the list of candidate content items in the database 115. The content item selection module 120 can also store the individual candidate content items in the database 115. Additionally or alternatively, content item selection module 120 can store an identifier for each candidate content item in the database 115.

The method 200 can identify a ghost content item as the predicted winner of a content item auction (ACT 215). The prediction module 125 can analyze the request and the list of candidate content items generated by content item selection module 120, and predict a winner of a content item auction. The predicted winner of the content item auction is called the "ghost" content item. The prediction module 125 can identify the ghost content item based on a prediction model, historical data, or combination of the two. The prediction module 125 can use the prediction model to execute a simulation, such as a simulated content item auction. The prediction module 125 can factor in some or all of the data used to judge the relevance of the candidate content items to the request, and can additionally factor in expected bids from one or more content provider computing devices 145 seeking to have their respective content items sent to the client computing device 150. The prediction module 125 can factor in constraints on bids imposed by content providers; for example a content provider may wish to only place bids during certain hours of the day, or may wish to only bid on requests arriving during odd seconds so as to split up a day and reduce its total expenditure. Other constraints that the prediction module 125 can consider include restrictions on the websites a content provider wishes its content items to appear on. The prediction can give the data processing system 110 a reasonably good guess for which content item of the plurality of content items is likely to win a content item auction, and thus be chosen to be transmitted to the client computing device 150 in response to the request.

The method 200 can assign the client computing device 150 to a test group or a control group (ACT 220). The data processing system can assign the client computing device into a test group or a control group based on a random, pseudo-random, or arbitrary model. In some implementations, the data processing system 110 can make the assignment base on, for example, a cookie or other identifier on the client computing device 150. The data processing system 110 can randomize the client computing devices 150 by applying a hash function to the identifier to generate a uniform random number. The data processing system 110 can then take the last two or three digits of the generated number, and assign the client computing device 150 to a test group or a control group based on whether those digits are above or below a predetermined threshold. The threshold can be set to produce a desired test/control group ratio for the particular experiment; for example, 50/50, 90/10, 10/90, etc. In some implementations, the data processing system 110 can make assignments based on identifiers that may not be unique to a client computing device 150, but may still yield results granular enough to be useful; such as a five- or nine-digit zip code. The assignment should be random; however, the identifier can be used to ensure that a particular client computing device 150 is consistently assigned to the test or control group such that all requests, ghost content item predictions, content item auction winners, and conversions are all counted toward the correct group. A variety of group assignment models can be used, as long as assignment is made on information unrelated to a conversion decision. For example, assigning a client computing device 150 to a test or control group depending on whether the request was made during an even or odd second of the day would yield acceptable results. In contrast, making assignment depending on whether the request was made between midnight and noon, or noon and midnight, may divide the population up into groups with different purchasing behaviors, which may lead to misleading measurements of content item effectiveness.

For a client computing device 150 assigned to the control group, the method 200 can remove the ghost content item from the list of candidate content items (ACT 225). After making the group assignment, the data processing system 110 can adjust the list of candidate content items accordingly. If the data processing system 110 assigns the client computing device 150 to the control group, the data processing system 110 can remove the ghost content item from the list of candidate content items. The data processing system 110 can update database 115 to reflect the removal. The data processing system 110 can additionally or alternatively remove the identifier corresponding to the ghost content item from the database 115. However it is accomplished, the purpose is to remove the ghost content item from consideration in the content item auction, so that content providers can bid to have the data processing system 110 deliver a different content item to the client computing device 150. The client computing device 150 assigned to the control group represents an appropriate counterfactual because it is a client computing device 150 that would have likely been selected for exposure to the ghost content item, but instead has had the ghost content item effectively blocked from view and replaced with another relevant content item.

The method 200 can execute a content item auction to identify a content item for display (ACT 230). The content item auction module 130 can execute a content item auction among the content items in the list of candidate content items (which, in the case of a client computing device 150 in the control group, excludes the ghost content item). The content item auction module 130 can accept bids from the content provider computing devices 145, and determine a content item auction winner. For a client computing device 150 assigned to the control group, the auction winner will be a content item other than the ghost content item.

The method 200 can transmit the content item for display to the client computing device 150 (ACT 235). The data processing system 110 can transmit to the client computing device 150 the content item identified by the content item auction module 130 as the winner of the content item auction. The content item can then appear in the slot in the online document loaded by the client computing device 150. In some implementations, the data processing system 110 can transmit the content item for display to the client computing device 150. In some implementations, the content provider computing device 145, or another computing device associated with the content provider, can transmit the content item for display to the client computing device 150 based on an instruction from the data processing system 110. The content item can be transmitted to the client computing device 150 via the network 105.

Although the data processing system 110 or content provider computing device 145 can transmit the content item for display to the client computing device 150, that does not guarantee that the content item for display will appear on the screen of the client computing device 150. Various downstream effects such as rejection of a content item by the content publisher computing device 140, a rendering error, latency, a logging error, or the like can prevent the client computing device 150 from displaying the content item. As described above, however, a measurement of the ghost content item's effectiveness may be more accurate if the data processing system 110 discounts these downstream effects rather than attempt to adjust for them. If the data processing system 110 does not have data on these downstream effects that is symmetric across both the test group and the control group, adjusting for ghost content item delivery failures would affect the test group and control group measurements differently, and introduce bias into the measurement of content item effectiveness. Therefore, for purposes of method 200, it is sufficient to know that the data processing system 110 or content provider computing device 145 attempted to deliver the content item for display to the client computing device 150.

The method 200 can identify computer network activity associated with the ghost content item by the client computing device 150 (ACT 240). The conversion detection module 135 can detect conversions by the client computing device 150 including a mouse over, a scroll over, a click, an item added to a shopping cart, and a purchase. In some implementations the conversion detection module 135 can receive conversion data from the client computing device 150. In some implementations the conversion detection module 135 can receive conversion data from the content provider computing device 145. In some implementations the conversion detection module 135 can receive conversion data from a third party system or service that correlates conversions with identifiers such as cookies or authenticated logins. Conversion data collected from the control group can be used to determine a baseline against which to measure the effectiveness of the ghost content item in generating conversions. In some implementations, it may be beneficial for the conversion detection module to take into account the timing of exposure and conversion events. For example, if a client computing device 150 executes a conversion before a content item was selected for delivery, there can be no possible causal link between the content item and the conversion. Including this conversion in the measurement would add noise and reduce statistical precision. If timing is taken into account, however, conversions that could not have resulted from content item exposures can be excluded from the measurement. It may be similarly beneficial to exclude conversions that resulted within a short period of time from the exposure. It may be highly unlikely that a conversion occurring fewer than 10-30 seconds after an exposure bears any causal relationship to that exposure; therefore, such conversions can safely be excluded from the measurement. As with any other information taken into account in the measurement, however, exposure and conversion timing information must be collected and applied symmetrically to the test group and control group. That means that even in the control group, conversions should only be measured if they follow exposure to the content item, even though the content item provided to the control group may bear no relation to the conversion.

For a client computing device 150 assigned to the test group, the method 200 can execute a content item auction to identify a content item for display (ACT 245). This step is similar to step 230 described above, but in this case the ghost content item remains in the list of candidate content items and is thus entered into the content item auction. The content item auction module 130 executes a content item auction among the content items identified in the list of candidate content items. The content item auction module 130 can accept bids from the content provider computing devices 145, and determine a content item auction winner.

The method 200 can transmit the content item for display to the computing device (ACT 250). This step is similar to step 235 described above. The data processing system 110 can transmit to the client computing device 150 the content item identified by the content item auction module 130 as the winner of the content item auction. The content item can then appear in the slot in the online document loaded by the client computing device 150. In some implementations, the data processing system 110 can transmit the content item for display to the client computing device 150. In some implementations, the content provider computing device 145, or another computing device associated with the content provider, can transmit the content item for display to the client computing device 150 based on an instruction from the data processing system 110. The content item can be transmitted to the client computing device 150 via the network 105.

As for the client computing device 150 assigned to the control group above, the method 200 can identify computer network activity associated with the ghost content item by the client computing device 150 assigned to the test group (ACT 240).

Figure 3:
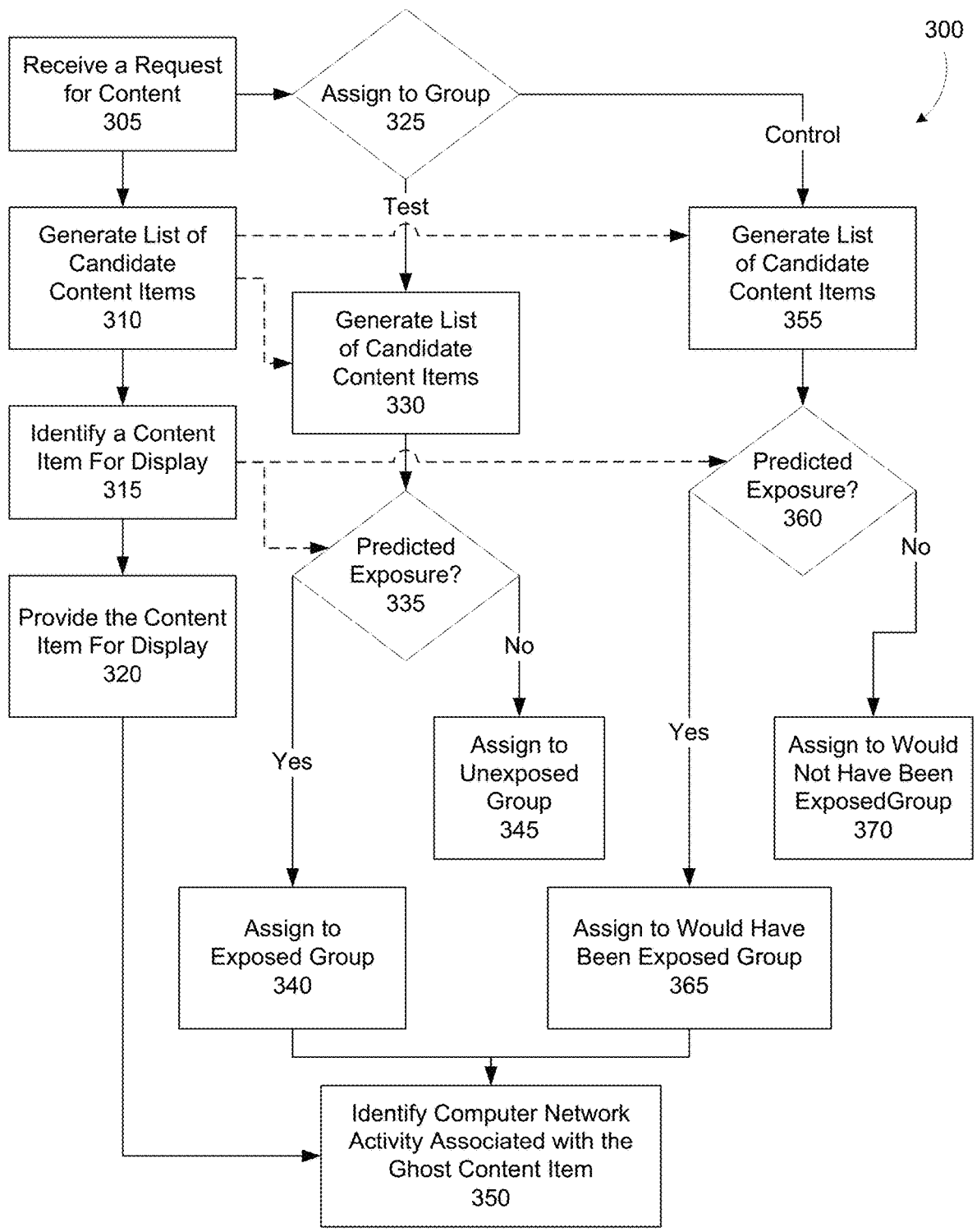
FIG. 3 is a flow diagram depicting an example method for determining the effectiveness of content items in a computer network environment, according to an illustrative implementation.

FIG. 3 is a flow diagram depicting an example method 300 for determining the effectiveness of content items in a computer network environment, according to an illustrative implementation. The method 300 can receive a request for content from a client computing device 150 (ACT 305). The method 300 can generate a list of candidate content items responsive to the request (ACT 310). The method 300 can execute a content item auction to identify a content item for display (ACT 315). The method 300 can transmit the content item for display to the client computing device 150 (ACT 320). The method 300 can assign the client computing device 150 to a test group or a control group (ACT 325). For a client computing device 150 assigned to the test group, the method 300 can generate a list of candidate content items responsive to the request (ACT 330). The method 300 can predict whether the ghost content item would have won the content item auction (ACT 335). For requests where the prediction module 125 predicts the ghost content item as the winner of the content item auction, the method 300 can assign the client computing device 150 to the "Exposed" group (ACT 340). For requests where the prediction module 125 does not predict the ghost content item as the winner of the content item auction, the method 300 can assign the client computing device 150 to the "Unexposed" group (ACT 345). For a client computing device 150 assigned to the control group, the method 300 can generate a list of candidate content items responsive to the request (ACT 355). The method 300 can predict whether the ghost content item would have won the content item auction (ACT 360). For requests where the prediction module 125 predicts the ghost content item as the winner of the content item auction, the method 300 can assign the client computing device 150 to the "Would Have Been Exposed" group (ACT 365). For requests where the prediction module 125 does not predict the ghost content item as the winner of the content item auction, the method 300 can assign the client computing device 150 to the "Would Not Have Been Exposed" group (ACT 370). The method 300 can identify computer network activity associated with the ghost content item (ACT 350).

The method 300 can receive a request for content from a client computing device 150 (ACT 305). This step is similar to step 205 described above. When the client computing device 150 loads an online document provided by a content publisher computing device 140, the online document may have a slot for the display of a content item. The client computing device 150 can transmit a request for a content item to display in the slot. The data processing system 110 can receive this request via the network 105.

The method 300 can generate a list of candidate content items responsive to the request (ACT 310). This step is similar to step 210 described above. The content item selection module 120 can use information included with the request to determine one or more content items responsive to the request. The content item selection module 120 can store the list of candidate content items in the database 115. The content item selection module 120 can also store the individual candidate content items in the database 115. Additionally or alternatively, content item selection module 120 can store an identifier for each candidate content item in the database 115.

The method 300 can execute a content item auction to identify a content item for display (ACT 315). Because the ghost content item has not yet been identified, and the client computing device 150 not yet assigned to a test or control group, the content item auction module 130 can simply execute a content item auction among the content items identified in the list of candidate content items. The content item auction module 130 can accept bids from the content provider computing devices 145, and determine a content item auction winner.

The method 300 can transmit the content item for display to the client computing device 150 (ACT 320). This step is similar to step 235 described above. The data processing system 110 can transmit to the client computing device 150 the content item identified by the content item auction module 130 as the winner of the content item auction. The content item can then appear in the slot in the online document loaded by the client computing device 150. In some implementations, the data processing system 110 can transmit the content item for display to the client computing device 150. In some implementations, the content provider computing device 145, or another computing device associated with the content provider, can transmit the content item for display to the client computing device 150.

The method 300 can assign the client computing device 150 to a test group or a control group (ACT 325). This step is similar to step 220 described above. The data processing system 110 can assign the client computing device 150 into a test group or a control group based on a random, pseudo-random, or arbitrary model.

For a client computing device 150 assigned to the test group, the method 300 can generate a list of candidate content items responsive to the request (ACT 330). This step is similar to step 210 described above; however, in this implementation the ghost content item winner is predicted "offline," after the content item has been transmitted to the client computing device 150 for display. In some implementations, the content item selection module 120 can use request information stored in the database 115 to determine one or more content items responsive to the request. In some implementations, the content item selection module 120 or the data processing system 110 can use the list of candidate content items generated in step 310. In such implementations, the content item selection module 120 or the data processing system 110 can retrieve the list of candidate content items from the database 115.

The method 300 can predict whether the ghost content item would have won the content item auction (ACT 335). This step is similar to step 215 described above, although the prediction can be made after the content item for display has been transmitted to the client computing device 150 in step 320. The prediction module 125 can analyze the request and the list of candidate content items generated by content item selection module 120, and predict a winner of a content item auction. The predicted winner of the content item auction is called the "ghost" content item. The prediction can give the data processing system 110 a reasonably good guess for which content item of the plurality of content items is likely to win a content item auction, and thus be chosen for transmission to the client computing device 150 in response to the request. In some implementations, the prediction module 125 can use the results of the actual content item auction, which was performed in step 315, to set boundaries for a simulation for identifying the ghost content item. Providing boundaries may allow the simulation to converge more quickly, reducing the processing resources required. When multiplied over thousands or millions of simulations, the benefit can be substantial. In addition, if the content item auction gave the ghost content item a low rank, indicating a very low probability of winning a simulation, the data processing system can default to a no-predicted-exposure assignment of the computing device without running the simulation, saving further processing resources with negligible effect on the accuracy of subsequent measurements.

For a client computing device 150 for whom the ghost content item was predicted to win the content item auction, the method 300 can assign that client computing device to the "Exposed" group (ACT 340).

For a client computing device 150 for whom the ghost content item was not predicted to win the content item auction, the method 300 can assign that client computing device to the "Unexposed" group (ACT 345).

For a client computing device 150 assigned to the control group in step 325, the method 300 can generate a list of candidate content items responsive to the request (ACT 355). This step is similar to step 330 described above.

The method 300 can predict whether the ghost content item would have won the content item auction (ACT 360). This step is similar to step 335 described above.

For a client computing device 150 for whom the ghost content item was predicted to win the content item auction, the method 300 can assign that client computing device to the "Would Have Been Exposed Group" group (ACT 365).

For a client computing device 150 for whom the ghost content item was not predicted to win the content item auction, the method 300 can assign that client computing device to the "Would Not Have Been Exposed Group" group (ACT 370).

The method 300 can identify computer network activity associated with the ghost content item (ACT 350). This step is similar to step 240 described above. The data processing system 110 can measure the number of conversions identified in the test group against the number of conversions identified in the control group to calculate the effectiveness of the ghost content item in generating conversions. The excess conversions in the test group over the baseline number of conversions in the control group represent the causal lift of the ghost content item. To achieve a less noisy measurement, the data processing system can limit its measurement to conversions resulting from the "Exposed" group, as determined in step 340, versus the "Would Have Been Exposed" group, as determined in step 365.

Figure 4:
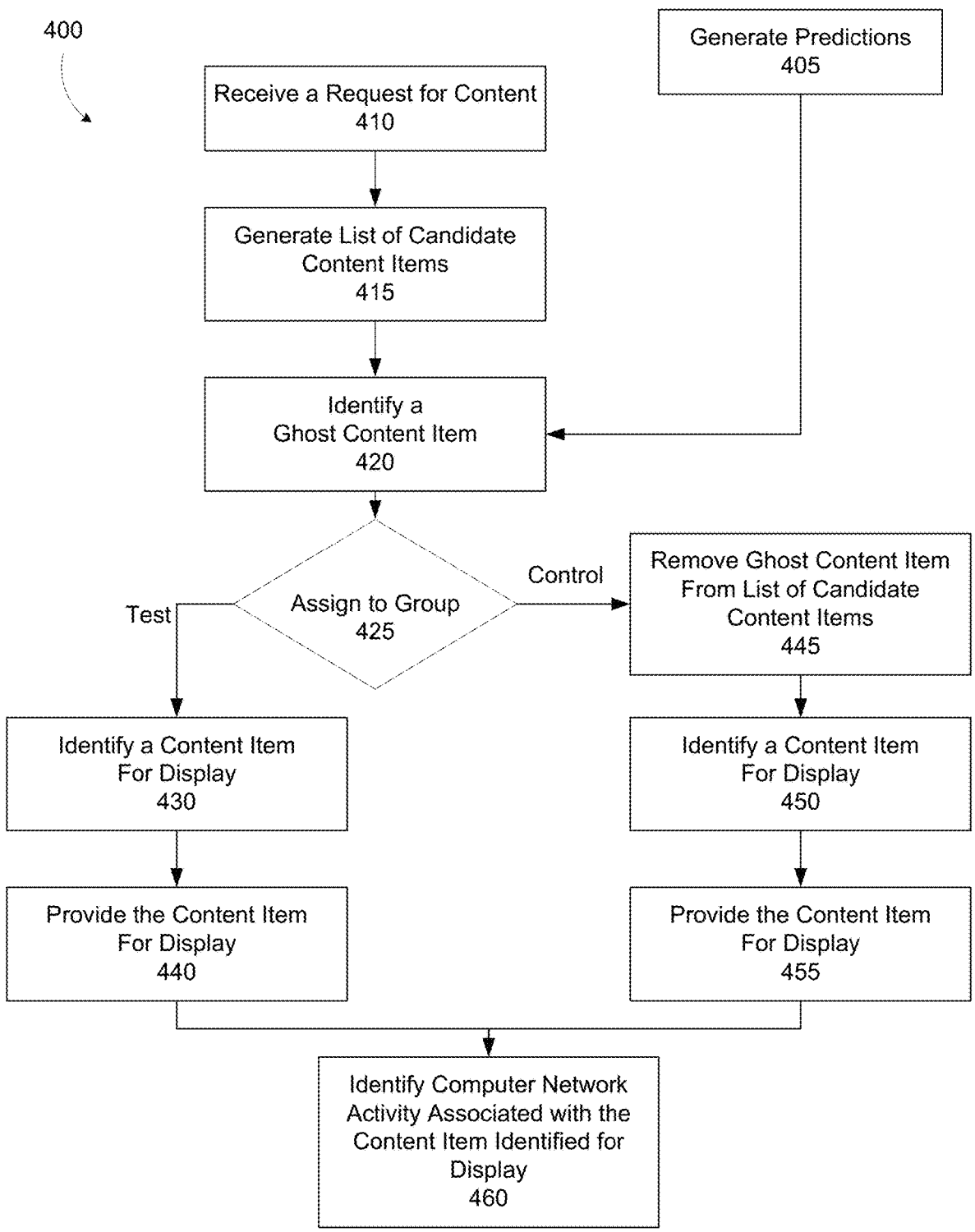
FIG. 4 is a flow diagram depicting an example method for determining the effectiveness of content items in a computer network environment, according to an illustrative implementation.

FIG. 4 is a flow diagram depicting an example method 400 for determining the effectiveness of content items in a computer network environment, according to an illustrative implementation. The method 400 can predict the winners of content item auctions (ACT 405). The method 400 can receive a request for content from a client computing device 150 (ACT 410). The method 400 can generate a list of candidate content items responsive to the request (ACT 415). The method 400 can retrieve a prediction generated in step 405 to identify a ghost content item (ACT 420). The method 400 can assign the client computing device 150 to a test or control group (ACT 425). For a client computing device 150 assigned to the test group, the method 400 can execute a content item auction to identify a content item for display (ACT 430); and provide the content item for display to the client computing device 150 (ACT 440). For a client computing device 150 assigned to the control group, the method 400 can remove the ghost content item from the list of candidate content items (ACT 445); execute a content item auction to identify a content item for display (ACT 450); and provide the content item for display to the client computing device 150 (ACT 455). The method 400 can identify computer network activity associated with the ghost content item (ACT 460).

The method 400 can predict the winners of content item auctions (ACT 405). The prediction module 125 can use a prediction model, historical data, or a combination of the two to predict a content item auction winner based on a hypothetical request. In some implementations, the prediction module 125 can use a prediction model to select a winner for each plausible combination of input data, and store a data array of hypothetical requests and predicted content item auction winners in the database 115. The prediction model can be prepared with the parameters of the content item auction to yield an expected winner based on information including request data, data related to candidate content items, and bid constraints. The prediction model can select a winner for each plausible combination of input data, and store the list of winners in the database 115. When the data processing system 110 receives a request for content, it can access the data array in the database 115 and retrieve the predicted winner. In some implementations, the data processing system 110 can use historical data to predict a winner for each plausible combination of input data. For example, one day's worth of requests may number into the thousands or millions spanning a large proportion of all possible combinations of input data. The data processing system 110 can combine this request data, along with the associated content item auction outcomes, to generate a large data array of hypothetical requests and predicted content item auction winners, and store it in the database 115. When the data processing system 110 receives a request, it can identify the ghost content item by retrieving the predicted content item auction winner from the data array in the database 115 without having to run a content item auction simulation at that time.

The method 400 can receive a request for content from a client computing device 150 (ACT 410). This step is similar to step 205 described above. When the client computing device 150 loads an online document provided by a content publisher computing device 140, the online document may have a slot for the display of a content item. The client computing device 150 can transmit a request for a content item to display in the slot. The data processing system 110 can receive this request via the network 105.

The method 400 can generate a list of candidate content items responsive to the request (ACT 415). This step is similar to step 210 described above. The content item selection module 120 can use information included with the request to determine one or more content items responsive to the request. The content item selection module 120 can store the list of candidate content items in the database 115. The content item selection module 120 can also store the individual candidate content items in the database 115. Additionally or alternatively, content item selection module 120 can store an identifier for each candidate content item in the database 115.

The method 400 can retrieve a prediction generated in step 405 to identify a ghost content item (ACT 420). The data processing system 110 or the prediction module 125 can retrieve from the database 115 the identity of a predicted content item auction winner based on the request received in step 410. The predicted winner can become the ghost content item.

The method 400 can assign the client computing device 150 to a test or control group (ACT 425). This step is similar to step 220 described above. The data processing system can assign the client computing device into a test group or a control group based on a random, pseudo-random, or arbitrary model.

For a client computing device 150 assigned to the test group, the method 400 can execute a content item auction to identify a content item for display (ACT 430); and provide the content item for display to the client computing device 150 (ACT 440). Step 430 is similar to step 245 described above. The content item auction module 130 can execute a content item auction among the content items in the list of candidate content items. The content item auction module 130 can accept bids from the content provider computing devices 145, and determine a content item auction winner. Step 440 is similar to step 250 described above. The data processing system 110 can transmit to the client computing device 150 the content item identified by the content item auction module 130 as the winner of the content item auction. The content item can then appear in the slot in the online document loaded by the client computing device 150. In some implementations, the data processing system 110 can transmit the content item for display to the client computing device 150. In some implementations, the content provider computing device 145, or another computing device associated with the content provider, can transmit the content item for display to the client computing device 150 based on an instruction from the data processing system 110. The content item can be transmitted to the client computing device 150 via the network 105.

For a client computing device 150 assigned to the control group, the method 400 can remove the ghost content item from the list of candidate content items (ACT 445); execute a content item auction to identify a content item for display (ACT 450); and provide the content item for display to the client computing device 150 (ACT 455). Step 445 is similar to step 225 described above. Having assigned the client computing device 150 to the control group, the data processing system 110 can remove the ghost content item from the list of candidate content items. The data processing system 110 can update database 115 to reflect the removal. The data processing system additionally or alternatively remove the identifier corresponding to the ghost content item from the database 115. Step 450 is similar to step 230 described above. The content item auction module 130 can execute a content item auction among the content items in the list of candidate content items. The content item auction module 130 can accept bids from the content provider computing devices 145, and determine a content item auction winner. Step 455 is similar to step 235 described above. The data processing system 110 can transmit to the client computing device 150 the content item identified by the content item auction module 130 as the winner of the content item auction. The content item can then appear in the slot in the online document loaded by the client computing device 150. In some implementations, the data processing system 110 can transmit the content item for display to the client computing device 150. In some implementations, the content provider computing device 145, or another computing device associated with the content provider, can transmit the content item for display to the client computing device 150 based on an instruction from the data processing system 110. The content item can be transmitted to the client computing device 150 via the network 105.

The method 400 can identify computer network activity associated with the ghost content item (ACT 460). This step is similar to step 240 described above. The data processing system 110 can measure the number of conversions identified in the test group against the number of conversions identified in the control group to calculate the effectiveness of the ghost content item in generating conversions. The excess conversions in the test group over the baseline number of conversions in the control group represent the causal lift of the ghost content item. The method 400 has an advantage in that it can include the ghost content item in the content item auction only if the ghost content item is predicted to win the content item auction, and thus eliminate the bias introduced by under-predictions 665. Under-predictions 665 occur when the prediction module 125 incorrectly predicts that the ghost content item will not win the content item auction. As described further below, under-predictions 665 can be problematic because excluding them from the experiment population can remove conversions asymmetrically from measurements of the test and control groups, resulting in a biased measurement.

Figure 5:
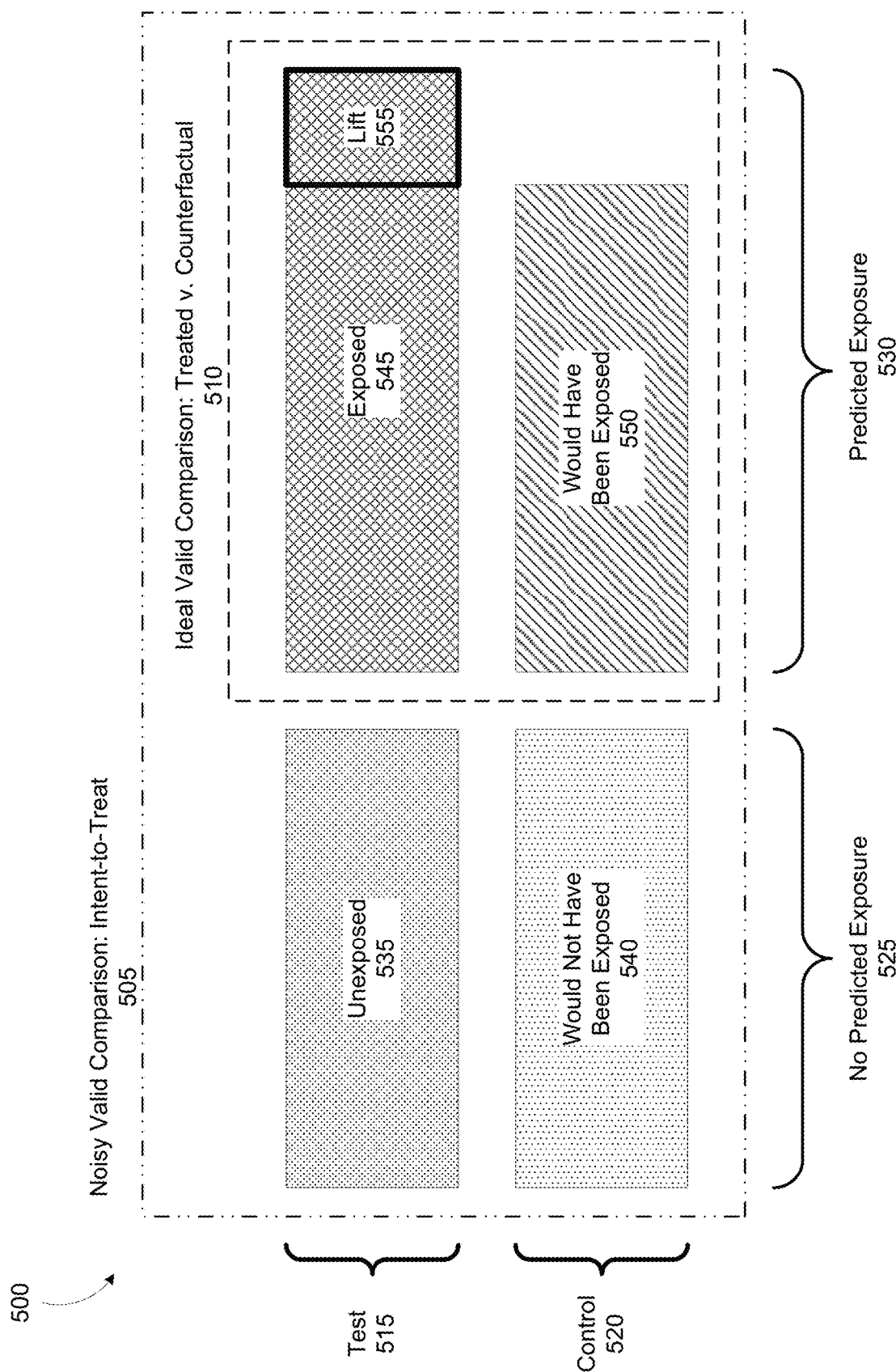
FIG. 5 is an illustration of noise reduction in an experiment for determining the effectiveness of content items in a computer network environment using a theoretical ideal prediction, according to illustrative implementations.

FIG. 5 is an illustration 500 of noise reduction in an experiment for determining the effectiveness of content items in a computer network environment using a theoretical ideal prediction, according to illustrative implementations. The illustration 500 shows a noisy valid comparison 505 compared with an ideal valid comparison 510. Each comparison measures the number of conversions in the test group 515 versus those in the control group 520. The size of each bar (535-555) represents the number of conversions in that group. The noisy valid comparison 505 includes conversions based on requests for which the ghost content item was not predicted as the winner of the content item auction, the "no predicted exposure group" 525, as well as those for which the ghost content item was predicted as the winner of the content item auction, the "predicted exposure group" 530. The no predicted exposure group 525 includes conversions from client computing devices 150 who were unexposed 535 and from client computing devices 150 who would not have been exposed 540. Dividing these conversions into two groups is arbitrary because as far as measurements of content item effectiveness are concerned, these experimental variable is the same in both cases—that is, there was no exposure to the ghost content item—and thus the conversions don't affect the measurement of effectiveness one way or the other. Taking account of these conversions, however, does add noise to the measurement of content item effectiveness. Using ghost content item predictions, however, we can remove the no predicted exposure group 525 from the measurement.

The ideal valid comparison 510 shows the conversions taken into account when the ghost content item prediction is ideal; that is, the winner of the content item auction is predicted with 100% accuracy. The ideal valid comparison 510 is made up of conversions from two groups: client computing devices 150 who had the ghost content item provided to them for display and were thus "exposed" 545; and client computing devices 150 who were predicted to see the ghost content item, but who were assigned to the control group 520 and thus "would have been exposed" 550. The ideal valid comparison 510 also includes conversions due to causal lift 555; that is, conversions in the exposed group 545 above what would be expected for an ineffective content item, as represented by the would have been exposed group 550.

The ideal valid comparison 510 excludes conversions from the no predicted exposure group 525. Excluding these conversions from measurement will not introduce bias into the measurement because the conversions are more or less equally distributed between the unexposed 535 and would not have been exposed 540 groups.

Figure 6:
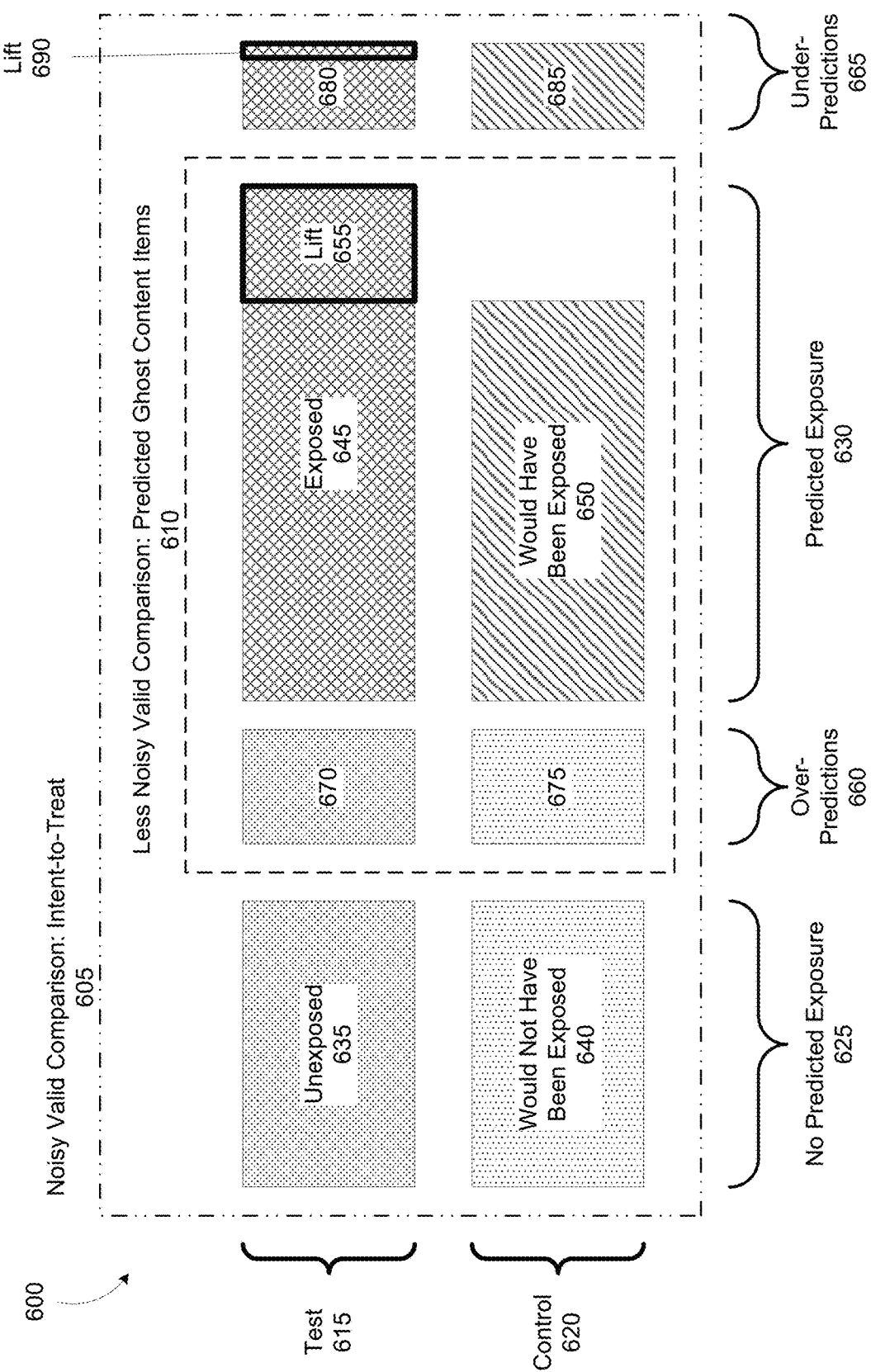
FIG. 6 is an illustration of noise reduction in an experiment for determining the effectiveness of content items in a computer network environment using a non-ideal prediction based on readily available information, according to illustrative implementations.

FIG. 6 is an illustration 600 of noise reduction in an experiment for determining the effectiveness of content items in a computer network environment using a non-ideal prediction based on information readily available from both test and control group client computing devices 150, according to illustrative implementations. The illustration 600 shows a noisy valid comparison 605 compared with less noisy valid comparison 610. Each comparison measures the number of conversions in the test group 615 versus those in the control group 620. The noisy valid comparison 605 includes conversions based on request for which the ghost content item was not predicted as the winner of the content item auction, the "no predicted exposure" group 625, as well those for which the ghost content item was predicted as the winner of the content item auction, the "predicted exposure group" 630. In this case, however, the prediction of the content item auction winner is not perfect, resulting in over-predictions 660 and under-predictions 665. Over-predictions 660 occur when the prediction module 125 incorrectly predicts the ghost content item as the winner of the content item auction. Under-predictions 665 occur when the prediction module 125 incorrectly predicts that the ghost content item will not win (or has not won) the content item auction (that is, the ghost content item won the content item auction even though it was not predicted to win).

The no predicted exposure group 625 includes conversions from client computing devices 150 who were unexposed 635 and from client computing devices 150 who would not have been exposed 640. Taking account of these conversions adds noise to the measurement of content item effectiveness. Using ghost content item predictions, however, can eliminate some of the noise contributed by the no predicted exposure group 625 from the measurement.

The less noisy valid comparison 610 includes the predicted exposure groups 630. These are the correctly predicted exposures. However, because the less noisy valid comparison 610 is not based on a 100% accurate prediction of the winner of the content item auction, it includes over-predictions 660 and excludes under-predictions 665. The over-predictions 660 include conversions from groups 670 and 675, which should have fallen into the no predicted exposure group 625. But since these conversions are equally distributed between the test group 615 and the control group 620, their inclusion should not bias the measurement, but may introduce an acceptable amount of noise.

More problematic, however, are the under-predictions 665 that are excluded from the less noisy valid comparison 610. In the under-predicted cases, the ghost content item was not predicted to win the content item auctions, so the under-predicted client computing devices 150 are mistakenly excluded from the measurement. The result is that conversions are removed disproportionately from the test group 615 and the control group 620 (an asymmetry represented by lift 690), which introduces a bias into the measurement. But as long as under-predictions are kept to a reasonably small proportion of the total population, the slight bias introduced is justified by the other benefits of using non-ideal predictions to reduce noise in the measurement. Based on the nature of the measurement error introduced by over-predictions versus under predictions, respectively, as a general rule it is better to minimize under-predictions while allowing for a greater but still reasonable number of over-predictions.

Figure 7A:
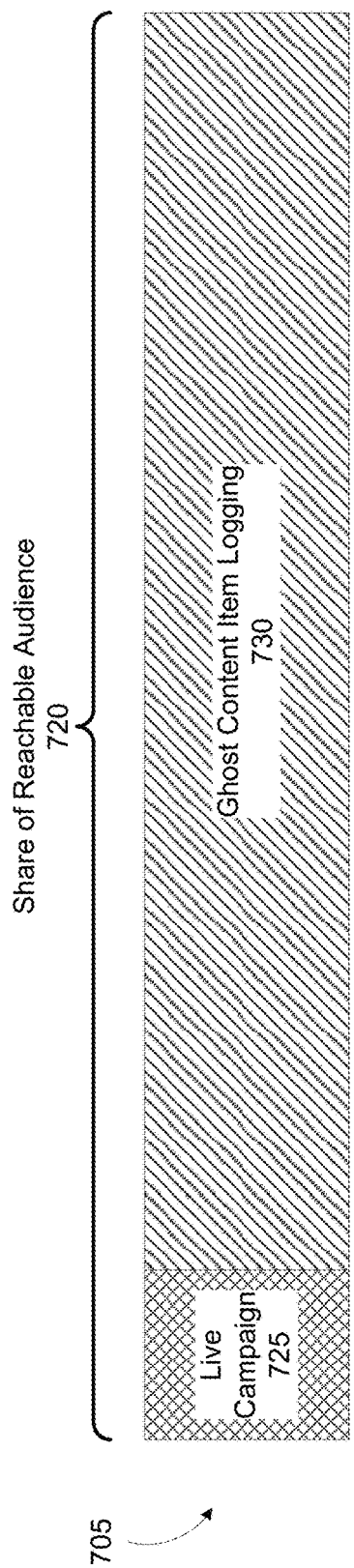
FIGS. 7A-7C illustrate test and control groups in several experiments for determining the effectiveness of content items in a computer network environment, according to illustrative implementations.
Figure 7B:
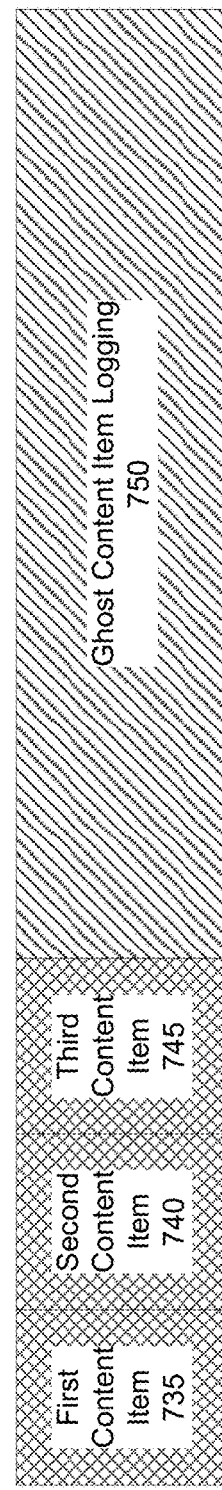
Figure 7C:
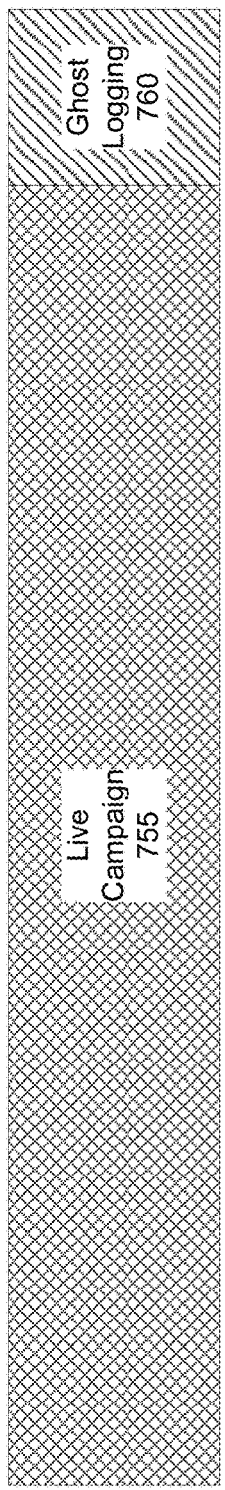

FIGS. 7A-7C illustrate test and control groups in several experiments for determining the effectiveness of content items in a computer network environment, according to illustrative implementations. In each experiment 705, 710, and 715 the bar represents the share of the reachable audience 720. FIG. 7A shows an experiment 705 employing a 10/90 test/control group split. The test group consists of the live campaign 725; these are the client computing devices 150 that the data processing system 110 has chosen for exposure to the ghost content item. The control group consists of the ghost content item logging group 730; these are client computing devices 150 for whom the data processing system 110 predicted the ghost content item as the winner of the content item auction, but then withheld the ghost content item.

FIG. 7B shows an experiment 710 employing three different test groups in a 10/10/10/70 test(a)/test(b)/test(c)/control group split. The three test groups represent client computing devices 150 shown the first content item 735, the second content item 740, or the third content item 745. The control group consists of the ghost content item logging group 750. Client computing devices 150 are assigned randomly to one of the four groups 735-750. Experiment 710 allows a content provider to test the effectiveness of three different content items against the same control group concurrently within the same population. Based on the outcome of this experiment 710, the content provider can choose one or more of the tested content items to roll out in a full-scale live campaign.

FIG. 7C shows an experiment 715 employing a 90/10 test/control group split. The test group consists of the live campaign 755, and the control group consists of the ghost content item logging group 760. Experiments such as experiment 715 can be useful for measuring the long-term effects of the campaign and ensure the accountability of content publishers, while still reaching a large proportion of the target audience for the ghost content item.

Predicting a single winner for each auction may be sufficient if each experiment is run on a discrete segment of the population, such as in the example shown in FIG. 7B. Problems may arise, however, if one attempts to run multiple experiments on the whole population, or run experiments that include multi-slotted, multi-unit, or whole-page auctions. In such cases, the simulator will only declare a single winner, which will fail to provide a counterfactual for each experiment. This becomes a problem when the simulator has inputs that interact. That is, if the winner depends on the participants, and multiple test content items are withheld, the simulation may not accurately predict which content item would have won the auction had only that test content item been withheld. In such cases it may be helpful to run multiple isolated auctions to more accurately predict counterfactual events for each experiment being run on the data set.

Figure 8A:
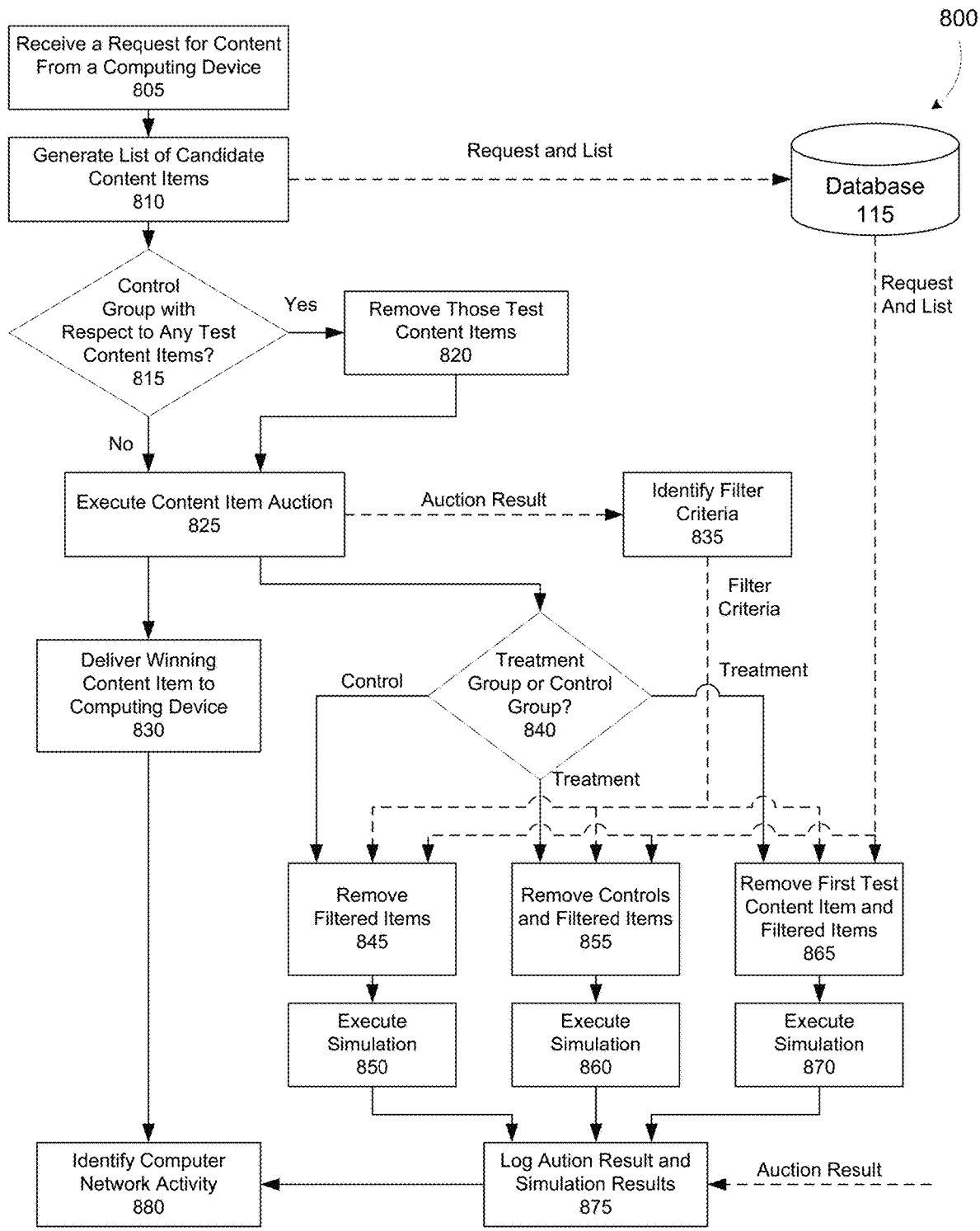
FIGS. 8A and 8B are flow diagrams depicting example methods for isolated simulations for accurate predictions of counterfactual events, according to an illustrative implementation.

FIG. 8A is a flow diagram depicting an example method 800 for isolated simulations for accurate predictions of counterfactual events, according to an illustrative implementation. The method 800 can receive a request for content from a client computing device 150 (ACT 805). The method 800 can generate a list of candidate content items responsive to the request (ACT 810). The method 800 can assign the client computing device 150 to a test group or a control group for one or more test content items (ACT 815). The method 800 can remove from the list of candidate content items any test content items for which the computing device is assigned to a control group (ACT 820). The method 800 can execute a content item auction to identify a content item for display (ACT 825). The method 800 can transmit the winning content item to the client computing device 150 (ACT 830). The method 800 can identify computer network activity associated with the test content items by the client computing device 150 (ACT 880).

The method 800 can identify filter criteria based on the result of the content item auction (ACT 835). For a client computing device 150 in the control group with respect to the first test content item (ACT 840), the method 800 can remove any content items not meeting the filter criteria from the list of candidate content items (ACT 845), and execute a simulation to determine a predicted ghost content item (ACT 850). For a client computing device 150 in the treatment group with respect to the first test content item (ACT 840), the method 800 can remove any test content items for which the client computing device 150 is assigned to a control group and any content items not meeting the filter criteria from the list of candidate content items (ACT 855), and execute a simulation to determine a predicted winning content item (ACT 860). For a client computing device 150 in the treatment group with respect to the first test content item (ACT 840), the method 800 can remove the first test content item and any content items not meeting the filter criteria from the list of candidate content items (ACT 865), and execute a simulation to determine a predicted absent ghost content item (ACT 870). The method 800 can log the auction result and the results of all simulations (ACT 875).

The method 800 can receive a request for content from a client computing device 150 (ACT 805). This step is similar to step 205 described above. When the client computing device 150 loads an online document provided by a content publisher computing device 140, the online document may have a slot for the display of a content item. The client computing device 150 can transmit a request for a content item to display in the slot. The data processing system 110 can receive this request via the network 105.

The method 800 can generate a list of candidate content items responsive to the request (ACT 810). This step is similar to step 210 described above. The content item selection module 120 can use information included with the request to determine one or more content items responsive to the request. In the case of a multi-slotted, multi-unit, or whole-page auction, the content item selection module 120 can determine one or more sets of content items responsive to the request. Each set of responsive content items makes up a candidate content item. The content item selection module 120 can store the request and the list of candidate content items in the database 115. The content item selection module 120 can also store the individual candidate content items in the database 115. Additionally or alternatively, content item selection module 120 can store an identifier for each candidate content item in the database 115. The stored request and list of candidate content items can be retrieved for use in the content item auction and simulations.

The method 800 can assign the client computing device 150 to a test group or a control group for one or more test content items (ACT 815). This step is similar to step 220 described above. The data processing system 110 can assign the client computing device 150 to a test group or a control group based on a random, pseudo-random, or arbitrary model. For a client computing device 150 in a data set subject to multiple experiments, the data processing system

110 can assign the client computing device 150 to a test group or a control group with respect to each experiment; i.e., each test content item.

The method 800 can remove from the list of candidate content items any test content items for which the computing device is assigned to a control group (ACT 820). Step 820 is similar to step 225 described above. The method 800 can generate a list of content items for auction from the list of candidate content items by removing any test content items for which the computing device is assigned to a control group. This will remove those test content item from being considered in the content item auction. For example, if a client computing device 150 is assigned to a control group with respect to the first test content item, the first test content item will be removed from the list of content items for auction. If a client computing device 150 is assigned to a control group with respect to the first test content item and a second test content item, both the first test content item and the second test content item will be removed from the list of content items for auction.

The method 800 can execute a content item auction to identify a content item for display (ACT 825). Step 825 is similar to step 230 described above. The content item auction module 130 can execute a content item auction among the content items in the list of candidate content items for auction. In the case of a multi-slotted, multi-unit, or whole-page auction, the content item auction module 130 can execute a content item auction among the sets of content items in the list of candidate content items for auction. The content item auction module 130 can accept bids from the content provider computing devices 145, and determine an auction result. The auction result can include a winning content item and a winning bid.

The method 800 can transmit the winning item to the client computing device 150 (ACT 830). Step 830 is similar to step 235 described above. The data processing system 110 can transmit to the client computing device 150 the winning content item identified by the content item auction module 130. In the case of a multi-slotted, multi-unit, or whole-page auction, the data processing system 110 can transmit to the client computing device 150 the winning set of content items identified by the content item auction module 130. The content item or items can appear in the slot or slots in the online document loaded by the client computing device 150. In some implementations, the data processing system 110 can transmit the content items for display to the client computing device 150. In some implementations, the content provider computing device 145, or another computing device associated with the content provider, can transmit the content items for display to the client computing device 150 based on an instruction from the data processing system 110. The content items can be transmitted to the client computing device 150 via the network 105.

The method 800 can identify computer network activity associated with the test content items by the client computing device 150 (ACT 880). This step is similar to step 240 described above. The data processing system 110 can identify computer network activity in several ways. For example, the data processing system 110 can include a tracking pixel in the winning content item, and deliver both to the client computing device 150. The tracking pixel can return information related to whether the winning content item rendered on the client computing device 150, identifying information about the client computing device 150, and information related to interaction with the winning content item. The data processing system 110 can also deliver a cookie with the winning content item. The data processing system 110 can read the cookie back and correlate conversions with the display of the winning content item.

The method 800 can identify filter criteria based on the result of the content item auction (ACT 835). The prediction module 125 of the data processing system 110 can use the auction result from step 825 to identify filter criteria that can be used to simplify simulations. For example, the prediction module 125 can use the auction result to identify the maximum bid amount of the winning content item. The prediction module 125 can use this information to disregard any candidate content items in the list of candidate content items that have a maximum bid less than the maximum bid of the winning content item. The possibility of such lower bid candidate content items winning the auction is low enough that they can be disregarded without significantly reducing the accuracy of the simulations. Furthermore, we only care about the auction result if one of the test content items has a reasonable chance of winning. If the auction result indicates that there was no reasonable chance for a test content item to have won, then it is not necessary to perform any isolated simulations for this request.

For a client computing device 150 in the control group with respect to the first test content item (ACT 840), the method 800 can remove any content items not meeting the filter criteria from the list of candidate content items (ACT 845). The prediction module 125 can retrieve the list of candidate content items from the database 115. The list of candidate content items retrieved from the database 115 can represent a pristine copy of the list of candidate content items generated in step 810, unaffected by the content item auction of step 825 or other simulations. The prediction module can then remove content item and content items not meeting the filter criteria, identified in step 835, from the list of candidate content items.

The method 800 can execute a simulation to determine a predicted ghost content item (ACT 850). The prediction module 125 can retrieve the request from the database 115. The request retrieved from the database 115 can represent a pristine copy of the request received at step 805, unaffected by the content item auction of step 825 or other simulations. The prediction module 125 can analyze the request and the list of candidate content items minus content items not meeting the filter criteria, and execute a simulation to identify a winner of a hypothetical content item auction. The identified winner of this simulated content item auction represents the "predicted ghost content item." The prediction module 125 can identify the predicted ghost content item based on a prediction model, historical data, or combination of the two. The prediction module 125 can use the prediction model to execute a simulation, such as a simulated content item auction. The prediction module 125 can factor in some or all of the data used to judge the relevance of the candidate content items to the request, and can additionally factor in expected bids from one or more content provider computing devices 145 seeking to have their respective content items sent to the client computing device 150. The prediction module 125 can factor in constraints on bids imposed by content providers; for example a content provider may wish to only place bids during certain hours of the day, or may wish to only bid on requests arriving during odd seconds so as to split up a day and reduce its total expenditure. Other constraints that the prediction module 125 can consider include restrictions on the websites a content provider wishes its content items to appear on. The prediction can give the data processing system 110 a reasonably good guess for which content item of the plurality of content items would be likely to win a content item auction if the client computing device's 150 assignment to a control group for any experiment is disregarded.

For a client computing device 150 in the treatment group with respect to the first test content item (ACT 840), the method 800 can remove any test content items for which the client computing device 150 is assigned to a control group and any content items not meeting the filter criteria from the list of candidate content items (ACT 855). The prediction module 125 can retrieve the list of candidate content items from the database 115. The list of candidate content items retrieved from the database 115 can represent a pristine copy of the list of candidate content items generated in step 810, unaffected by the content item auction of step 825 or other simulations. The prediction module can then remove content items not meeting the filter criteria, and all content items for which the client computing device 150 is assigned to a control group, from the list of candidate content items.

The method can execute a simulation to determine a predicted winning content item (ACT 860). The simulation performed in step 860 can be similar to that performed in step 850. The prediction module 125 can retrieve the request from the database 115. The request retrieved from the database 115 can represent a pristine copy of the request received at step 805, unaffected by the content item auction of step 825 or other simulations. The prediction module 125 can analyze the request and the list of candidate content items minus content items not meeting the filter criteria, and all content items for which the client computing device 150 is assigned to a control group, and execute a simulation to identify a winner of a hypothetical content item auction. The identified winner of this simulated content item auction represents the "predicted winning content item." The predicted winning content item is a reasonably good guess for which content item would win a content item auction. The result may be redundant in light of the content item auction of step 825. Accordingly, if a test content item wins the content item auction, the simulation to determining a predicted winning content item may consist of taking a snapshot of the state of the content item auction at a predetermined point in the auction-delivery process; for example, after content item relevance and bid have been taken into account, but before the system attempts to deliver the winning content item and meets with any downstream effects. Furthermore, the predicted winning content item only matters if one of the test content items has a reasonable chance of winning the auction. Therefore, if a test content item does not win the content item auction, and the simulation to determine the predicted winning content item indicates that there was no reasonable chance for a test content item to have won the content item auction, then it is not necessary to perform any further isolated simulations for this request.

For a client computing device 150 in the treatment group with respect to the first test content item (ACT 840), the method 800 can remove the first test content item and any content items not meeting the filter criteria from the list of candidate content items (ACT 865). The prediction module 125 can retrieve the list of candidate content items from the database 115. The list of candidate content items retrieved from the database 115 can represent a pristine copy of the list of candidate content items generated in step 810, unaffected by the content item auction of step 825 or other simulations. The prediction module can then remove the first test content item and content items not meeting the filter criteria from the list of candidate content items.

The method 800 can execute a simulation to determine a predicted absent ghost content item (ACT 870). The simulation performed in step 870 can be similar to that performed in step 850. The prediction module 125 can retrieve the request from the database 115. The request retrieved from the database 115 can represent a pristine copy of the request received at step 805, unaffected by the content item auction of step 825 or other simulations. The prediction module 125 can analyze the request and the list of candidate content items minus the first test content item and any content items not meeting the filter criteria, and execute a simulation to identify a winner of a hypothetical content item auction. The identified winner of this simulated content item auction represents the "predicted absent ghost content item." The predicted absent ghost content can represent the content item auction counterfactual for the control group; that is, the content item predicted to most likely win a content item auction when only the first test content item is withheld from the auction.

The method 800 can log the auction result and the results of all simulations (ACT 875). The data processing system 110 can log the auction result, the predicted ghost content item, the predicted winning content item, and the predicted absent ghost content item in the database 115. The data processing system 110 can analyze the computer network activity identified in step 880 in light of the results logged in step 875 to measure the effectiveness of one or more test content items in producing conversions associated with that content item.

The method 800 can be expanded to perform experiments on two or more test content items using the same data set. For example, the steps of the method 800 can be combined with the steps of the method 801 described in FIG. 8B for running two experiments on two test content items, respectively. In a similar manner, additional experiments on additional test content items can be performed using the same dataset.

Figure 8B:
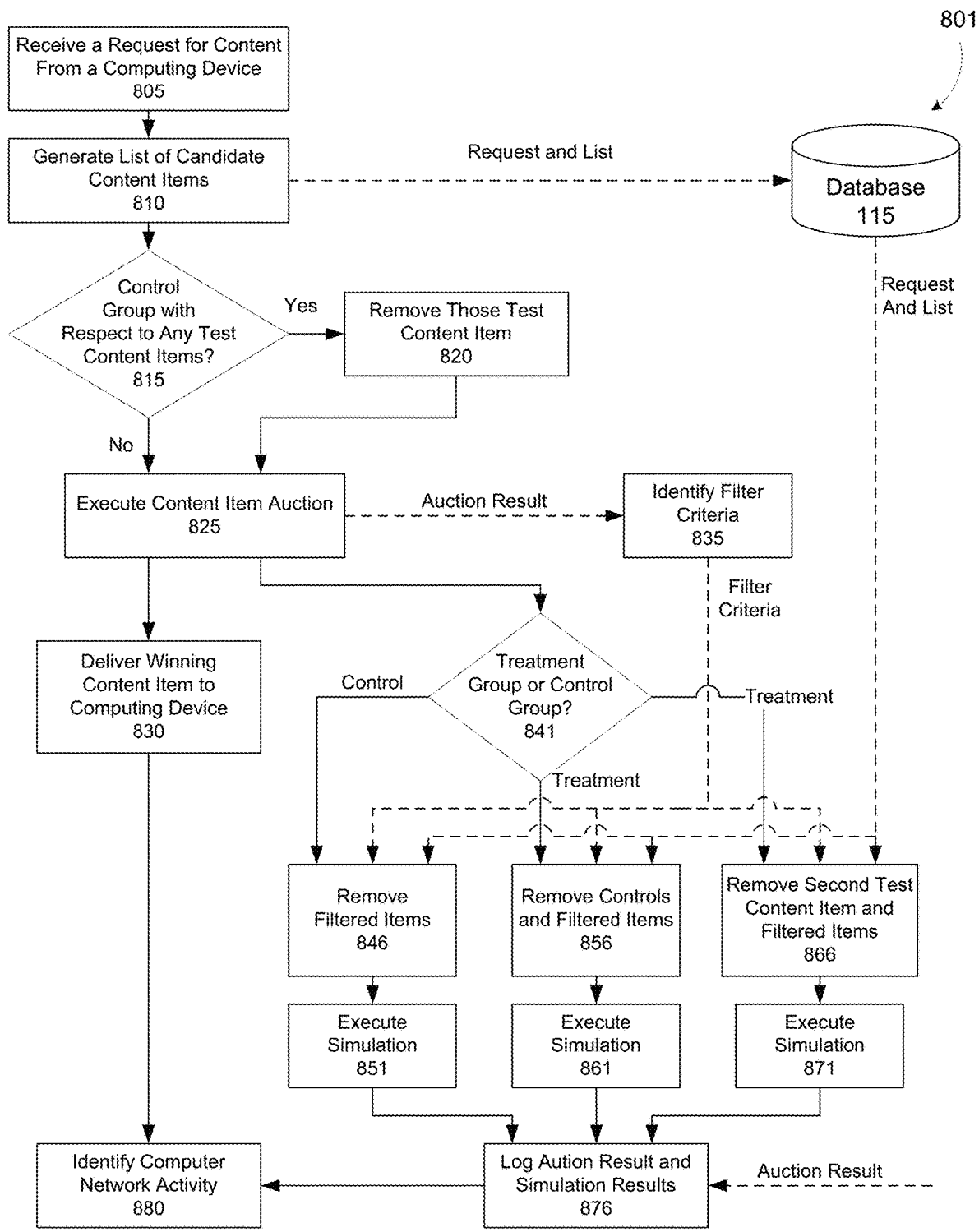

FIG. 8B is a flow diagrams depicting an example method 801 for isolated simulations for accurate predictions of counterfactual events, according to an illustrative implementation. The steps of method 801 can be performed in conjunction with the steps of method 800 when performing two experiments on two test content items, respectively, using the same dataset. The method 801, as in the method 800 described above, can receive a request for content from a client computing device 150 (ACT 805). The method 801 can generate a list of candidate content items responsive to the request (ACT 810). The method 801 can assign the client computing device 150 to a test group or a control group for one or more test content items (ACT 815). The method 801 can remove from the list of candidate content items any test content items for which the computing device is assigned to a control group (ACT 820). The method 801 can execute a content item auction to identify a content item for display (ACT 825). The method 801 can transmit the winning content item to the client computing device 150 (ACT 830). The method 801 can identify filter criteria based on the result of the content item auction (ACT 835). The method 801 can identify computer network activity associated with the test content items by the client computing device 150 (ACT 880). The steps 805-835 and 880 of the method 801 are similar to the steps of the same numbers described above with regard to the method 800, and need not be described further.

For a client computing device 150 in the control group with respect to the second test content item (ACT 841), the method 801 can remove any content items not meeting the filter criteria from the list of candidate content items (ACT 846), and execute a simulation to determine a predicted ghost content item (ACT 851). For a client computing device 150 in the treatment group with respect to the second test content item (ACT 841), the method 801 can remove any test content items for which the client computing device 150 is assigned to a control group and any content items not meeting the filter criteria from the list of candidate content items (ACT 856), and execute a simulation to determine a predicted winning content item (ACT 861). For a client computing device 150 in the treatment group with respect to the second test content item (ACT 841), the method 801 can remove the second test content item and any content items not meeting the filter criteria from the list of candidate content items (ACT 866), and execute a simulation to determine a predicted absent ghost content item (ACT 871). The method 801 can log the auction result and the results of all simulations (ACT 876).

The steps 841-876 of the method 801 are similar to the corresponding steps 840-875 described above with regard to the method 800, with the exception that where the steps depend on the particular test content item at issue, the steps of the method 801 are performed with respect to the second test content item. For example, at step 841 the method 801 can determine whether the client computing device 150 issuing the request for content is assigned to the treatment or control group with respect to the second test content item. And at step 866, the method 801 can remove the second test content item and any content items not meeting the filter criteria from the list of candidate content items.

The methods 800 and 801 can be expanded to perform experiments on more than two test content items using the same data set. For example, steps 841-871 of the method 801 can be repeated for each additional test content item to be analyzed within the dataset.

The methods 800 and 801 can reduce the computational cost of performing experiments. For example, if the outcome of the content item auction indicates that the first test content item had little chance of winning (because of a low maximum bid amount or lack of relevance to the request), then no simulations need be performed because the request and the computing device that issued it may not be good candidates for that experiment. In addition, each simulation that is performed can be simplified by disregarding any candidate content items that do not meet the filter criteria. In this manner, the simulations can be performed on a dataset smaller than the full list of candidate content items that competed in the auction. Other simulations may be dispensed with as redundant if it is found that the set of inputs will be the same as a simulation already performed. For example, the simulations executed in steps 850 and 851 may be redundant for a request from a computing device assigned to a control group with respect to both the first test content item and the second test content item. Similarly, the simulations executed in steps 860 and 861 may be redundant for a request from a computing device assigned to a treatment group with respect to both the first test content item and the second test content item. In some cases, the simulations executed in steps 860 and 861 may be redundant in light of the actual content item auction if the inputs are the same; i.e., no candidate content items are filtered.

The methods 800 and 801 can also be used to reduce bias introduced by limited visibility over the outcome of content item delivery to the client device 150. For example, the data processing system may have ownership, agency, or some other control or influence over some content items, but not over others. Accordingly, the data processing system 110 may not be able to observe the outcome of delivery of certain content items. This can occur when the data processing system 110 executes content item auctions that include both content items under its control, and content items not under its control. The data processing system 110 may have the authority or ability to implement a tracking pixel, cookie, or other labeling or tracking mechanism in the content items under its control, but not on the content items not under its control. The resulting observations may therefore over represent outcomes from content items under the control of the data processing system 110. This is sometimes referred to as the "pixeling problem."

The methods described above can provide a means for the data processing system 110 to avoid or compensate for limited outcome visibility. For example, in an experiment to determine the effectiveness of a first test content item in producing conversions associated with that content item, an accurate measurement requires having an outcome that is observable regardless of whether the first test content item wins or loses the content item auction. The method can receive a request from a computing device. Assume that the computing device is assigned to the treatment group with regard to the first test content item. The simulation executed at step 860 can predict which content item would be most likely to win a content item auction (since the actual content item auction will also have control group content items withheld, as in steps 820 and 855, respectively). This is the predicted winning content item. The simulation at step 870 can predict which content item would be most likely to win a content item auction if only the first test content item is withheld from the content item auction. This is the predicted absent ghost content item. If the data processing system 110 can determine that it has visibility over both the predicted winning content item and the predicted absent ghost content item, the data processing system 110 can determine that inclusion of this request in the experiment should not be affected by biased introduced by limited outcome visibility. If the data processing system 110 determines that it does not have visibility for one or both of the predicted content items, it may disregard that request from measurement.

As described above with regard to single ghost content item experiments, the simulations do not have to be perfectly accurate to reduce bias. As long as the predicted ghost content item, the predicted winning content item, and the predicted absent ghost content item can be predicted with some minimal accuracy—say, 50%—the prediction results can reduce bias introduced by limited outcome visibility.

FIG. 9 is a table describing isolated simulations for accurate predictions of counterfactual events, according to an illustrative implementation. The table 900 illustrates all of the simulations for some example requests that include predicted ghost content items and predicated absent ghost content items.

The rows 905-925 each represent a request or query coming from a different computing device or user. The columns 935-960 represent sets of content items. The column 935 represents all content items in the list of candidate content items. The content item selection module 120 has identified these candidate content items as relevant to the request. For each query in this example, the content item selection module 120 has identified six candidate content items as relevant. In each case, four of those candidate content items are test content items, and two are "real" content items (that is, not subject to an experiment). Of the test content items, the query has been randomly assigned to a test group "T" or a control group "C." For example, the cell 965 shows a list of candidate content items identified in response to a first request (row 905). In this case, the list of candidate content items lists four test content items shown as "T", and two regular content items shown as "R". Similarly, the cell 970 shows a list of candidate content items identified in response to a second request (row 910). In this case, the list of candidate content items includes a test content item for which the second request is assigned to the control group shown as "C". Note that in the true auction shown in the column 940, the test content item for which the second request has been assigned to the control group has been withheld (cell 975).

The table 900 shows which simulations represent a statistical counterpart for the true auction in the column 940. For example, the true auction for query 1 (cell 980) has a statistical counterpart at the true auction for query 2 (cell 975) with respect to the first test content item. That is, the events in the cells 975 and 980 are statistical counterparts based on the randomization that assigned query 1 to the treatment group and query 2 to the control group. Notice that the "T" in the first position of the list of candidate content items in the cell 980 is missing from the first position of the list of candidate content items in the cell 975. Therefore, the outcome of the true auction at the cell 975, including any subsequent computer network activity, represents a statistical counterpart to the outcome of the true auction at the cell 980 with regard to the test content item in the first position of the list of candidate content items. That is because the outcome of the true auction at the cell 975 represents what would happen if only that first test content item is removed from consideration in the true auction.

The table 900 also shows which simulations represent a predicted ghost content item for the true auction in the column 940. Notice that the first test content item is listed as a "T" in the cell 980 and as a "C" in the cell 985, while the presence or absence of all other content items remains the same in both sets. Accordingly, if the first "T" wins the true auction in the cell 980, and the "C" wins the simulation in the cell 985, the "C" will be the predicted ghost content item. Similarly, the true auction for query 2 (cell 975) has a counterfactual at simulation 2 for query 3 (cell 990) with respect to the second test content item. Again, if the "T" in the second space wins the true auction in the cell 975, and the "C" in the second space of the cell 990 wins the simulation, the "C" will be the predicted ghost content item.

The table 900 also shows which simulations represent a predicted absent ghost content item for the true auction in the column 940. Notice that the first test content item is listed as a "-" in the cell 975 and as a "-" in the cell 995, while the presence or absence of all other content items remains the same in both sets. Accordingly, if the same content item wins the true auction in the cell 975 and the simulation in the cell 995, that content item becomes the predicted absent ghost content item for queries 1 and 2. The predicted absent ghost content item can reveal what will happen if the first test content item is withheld from the true auction, regardless of whether the query is in the test or control group. If the query is assigned to the control group, however, the true auction has already revealed what the winning content item will be if the first test content item is withheld from the true auction. The predicted absent ghost content item can further reveal the extent of viewability information available from the winning content item corresponding to queries assigned to the control group.

Figure 10:
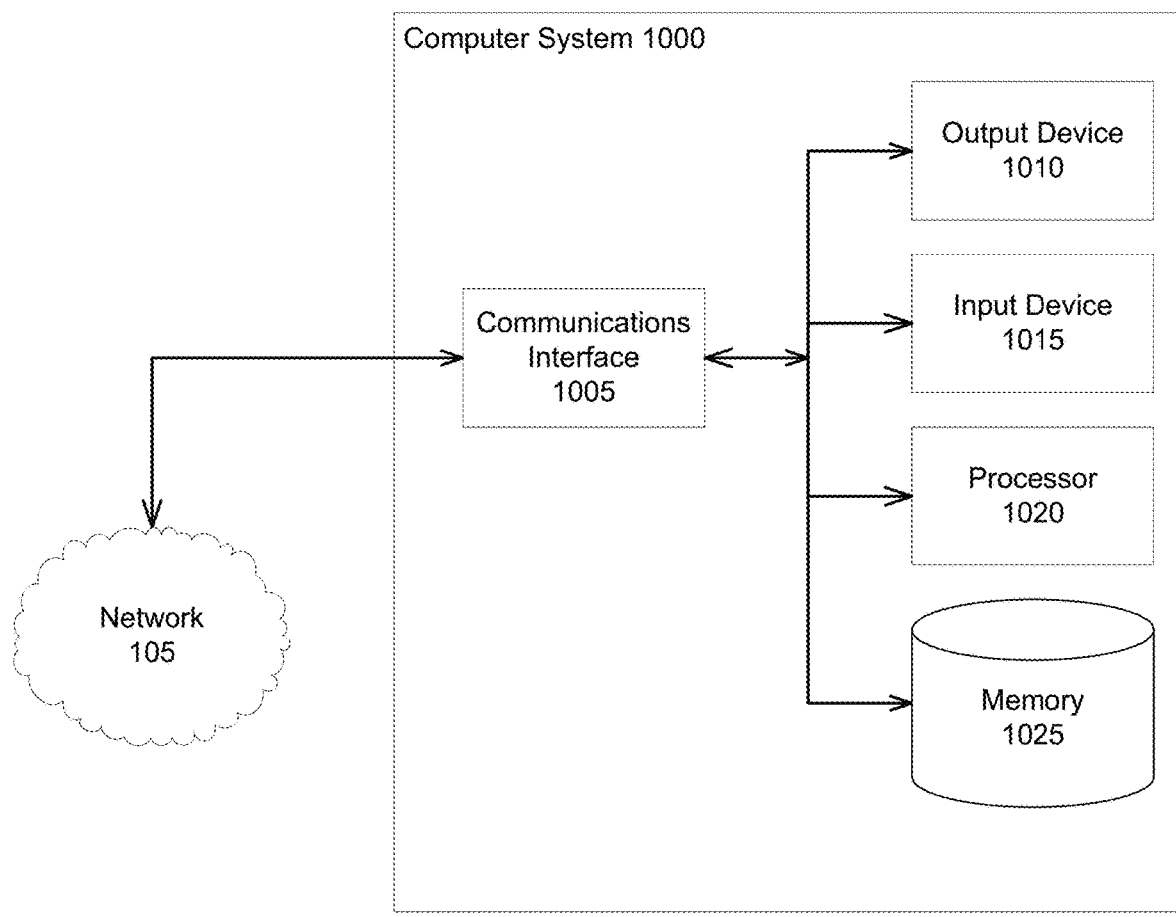
FIG. 10 is a block diagram illustrating a general architecture for a computer system that may be employed to implement elements of the systems and methods described and illustrated herein, according to an illustrative implementation.

FIG. 10 shows the general architecture of an illustrative computer system 1000 that may be employed to implement any of the computer systems discussed herein (including the data processing system 110 and its components such as the database 115, the content item selection module 120, the prediction module 125, the content item auction module 130, and the conversion detection module 135) in accordance with some implementations. The computer system 1000 can be used to provide information via the network 105; for example, to determine the effectiveness of content items in a computer network environment, and provide that information to the content provider computing device 145 via the network 105. The computer system 1000 includes one or more processors 1020 communicatively coupled to at least one memory 1025, one or more communications interfaces 1005, one or more output devices 1010 (e.g., one or more display units) or one or more input devices 1015 (e.g., one or more touchscreens, keypads, microphones, or the like). The processors 1020 can be included in the data processing system 110 or the other components such as the database 115, the content item selection module 120, the prediction module 125, the content item auction module 130, and the conversion detection module 135.

The memory 1025 can include computer-readable storage media, and can store computer instructions such as processor-executable instructions for implementing the operations described herein. The database 115, the content item selection module 120, the prediction module 125, the content item auction module 130, or the conversion detection module 135 can include the memory 1025 to store the data received from the content provider computing device 145 or the client computing device 150, for example. The at least one processor 1020 can execute instructions stored in the memory 1025 and can read from or write to the memory information processed and or generated pursuant to execution of the instructions.

The processors 1020 can be communicatively coupled to or control the at least one communications interface 1005 to transmit or receive information pursuant to execution of instructions. For example, the communications interface 1005 can be coupled to a wired or wireless network, bus, or other communication means and can allow the computer system 1000 to transmit information to or receive information from other devices (e.g., other computer systems). One or more communications interfaces 1005 can facilitate information flow between the components of the system 100. In some implementations, the communications interface 1005 can (e.g., via hardware components or software components) provide a website as an access portal to at least some aspects of the computer system 1000. Examples of communications interfaces 1005 include user interfaces.

The output devices 1010 can allow information to be viewed or perceived in connection with execution of the instructions. The input devices 1015 can allow a user to make manual adjustments, make selections, enter data or other information, or interact in any of a variety of manners with the processor during execution of the instructions.

The subject matter and the operations described herein can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing system or apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The term "data processing system" or "computing device" "module" "engine" or "component" encompasses apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The database 115, the content item selection module 120, the prediction module 125, the content item auction module 130, or the conversion detection module 135 can include or share one or more data processing apparatus, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The environment 100 or system 1000 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server (e.g., received by the data processing system 110 from the content provider computing device 145 or the client computing device 150).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the database 115, the content item selection module 120, the prediction module 125, the content item auction module 130, or the conversion detection module 135 can be a single module, a logic device having one or more processing circuits, or part of one or more servers of the data processing system 110.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer implemented method of performing experiments on a population to measure causal effects of content items in a computer network environment, comprising:

for each request among multiple different received requests:

identifying, by a data processing system, a set of candidate content items that are eligible for presentation in response to the request;

predicting, for a particular candidate content item among the set of candidate content items and based on a first simulation, whether the particular candidate content item will win a content item auction performed based on the request;

selecting, by the data processing system, a client computing device that submitted the request as appropriate for measurement based on the prediction indicating that the particular content item will win the content item auction;

selectively withholding, by the data processing system, the particular candidate content item from the content item auction based on whether the client computing device that submitted the request is assigned to a control group or a test group for the particular candidate content item, including withholding the particular candidate content item from the content item auction when the client computing device is assigned to the control group;

selectively performing, by the data processing system, additional simulations required to account for effects of multiple different experiments on whether the particular candidate content item will win the content item auction, including refraining from performing the additional simulations when the prediction indicates that the particular candidate content item will not win the content item auction;

delivering, by the data processing system and to the client computing device, the particular candidate content item in response to at least some of the multiple different received requests for which the particular candidate content item was identified as a winner of the content item auction;

identifying, by the data processing system, network activity associated with the particular candidate content item subsequent to delivery; and determining an effectiveness of the particular candidate content item based on the network activity.

2. The computer implemented method of claim 1, wherein selectively performing additional simulations comprises performing separate simulations for each of the multiple different experiments when the prediction indicates that the particular candidate content item will win the content item auction.

3. The computer implemented method of claim 1, wherein determining an effectiveness of the particular candidate content item comprises determining a difference in the amount of network activity performed by users of client computing devices that were included in the test group relative to the amount of network activity performed by the users of the client computing devices that were included in the control group.

4. The computer implemented method of claim 3, further comprising:

prior to determining the effectiveness of the particular candidate content item, filtering the network activity that was performed within a threshold amount of time following exposure of the candidate content item to the users of the client computing devices that were included in the test group.

5. The computer implemented method of claim 1, wherein identifying network activity comprises:

including a tracking pixel with the particular candidate content item; and receiving visibility information from the client computing device based on a firing of the tracking pixel at the client computing device.

6. The computer implemented method of claim 1, wherein identifying network activity comprises:
including a cookie with the delivered particular candidate content item; and
detecting the cookie on the client computing device during subsequent computer network activity.

7. A system for performing experiments on a population to measure causal effects of content items in a computer network environment, comprising a data processing system having one or more processors configured to perform operations including:
for each request among multiple different received requests:
identifying a set of candidate content items that are eligible for presentation in response to the request;
predicting, for a particular candidate content item among the set of candidate content items and based on a first simulation, whether the particular candidate content item will win a content item auction performed based on the request;
selecting a client computing device that submitted the request as appropriate for measurement based on the prediction indicating that the particular content item will win the content item auction;
selectively withholding the particular candidate content item from the content item auction based on whether the client computing device that submitted the request is assigned to a control group or a test group for the particular candidate content item, including withholding the particular candidate content item from the content item auction when the client computing device is assigned to the control group;
selectively performing additional simulations required to account for effects of multiple different experiments on whether the particular candidate content item will win the content item auction, including refraining from performing the additional simulations when the prediction indicates that the particular candidate content item will not win the content item auction;
delivering, to the client computing device, the particular candidate content item in response to at least some of the multiple different received requests for which the particular candidate content item was identified as a winner of the content item auction;
identifying network activity associated with the particular candidate content item subsequent to delivery; and
determining an effectiveness of the particular candidate content item based on the network activity.

8. The system of claim 7, wherein selectively performing additional simulations comprises performing separate simulations for each of the multiple different experiments when the prediction indicates that the particular candidate content item will win the content item auction.

9. The system of claim 7, wherein determining an effectiveness of the particular candidate content item comprises determining a difference in the amount of network activity performed by users of client computing devices that were included in the test group relative to the amount of network activity performed by the users of the client computing devices that were included in the control group.

10. The system of claim 9, wherein the one or more processors are configured to perform operations further comprising:
prior to determining the effectiveness of the particular candidate content item, filtering the network activity that was performed within a threshold amount of time following exposure of the candidate content item to the users of the client computing devices that were included in the test group.

11. The system of claim 7, wherein identifying network activity comprises:
including a tracking pixel with the particular candidate content item; and
receiving visibility information from the client computing device based on a firing of the tracking pixel at the client computing device.

12. The system of claim 7, wherein identifying network activity comprises:
including a cookie with the delivered particular candidate content item; and
detecting the cookie on the client computing device during subsequent computer network activity.

13. A non-transitory computer readable storage medium storing instructions that, when executed by data processing system, cause the data processing system to perform operations comprising:
for each request among multiple different received requests:
identifying a set of candidate content items that are eligible for presentation in response to the request;
predicting, for a particular candidate content item among the set of candidate content items and based on a first simulation, whether the particular candidate content item will win a content item auction performed based on the request;
selecting a client computing device that submitted the request as appropriate for measurement based on the prediction indicating that the particular content item will win the content item auction;
selectively withholding the particular candidate content item from the content item auction based on whether the client computing device that submitted the request is assigned to a control group or a test group for the particular candidate content item, including withholding the particular candidate content item from the content item auction when the client computing device is assigned to the control group;
selectively performing additional simulations required to account for effects of multiple different experiments on whether the particular candidate content item will win the content item auction, including refraining from performing the additional simulations when the prediction indicates that the particular candidate content item will not win the content item auction;
delivering, to the client computing device, the particular candidate content item in response to at least some of the multiple different received requests for which the particular candidate content item was identified as a winner of the content item auction;
identifying network activity associated with the particular candidate content item subsequent to delivery; and
determining an effectiveness of the particular candidate content item based on the network activity.

14. The non-transitory computer readable storage medium of claim 13, wherein selectively performing additional simulations comprises performing separate simulations for each of the multiple different experiments when the prediction indicates that the particular candidate content item will win the content item auction.

15. The non-transitory computer readable storage medium of claim 13, wherein determining an effectiveness of the particular candidate content item comprises determining a difference in the amount of network activity performed by users of client computing devices that were included in the test group relative to the amount of network activity performed by the users of the client computing devices that were included in the control group.

16. The non-transitory computer readable storage medium of claim 15, wherein the instructions cause the data processing system to perform operations further comprising:
    prior to determining the effectiveness of the particular candidate content item, filtering the network activity that was performed within a threshold amount of time following exposure of the candidate content item to the users of the client computing devices that were included in the test group.

17. The non-transitory computer readable storage medium of claim 13, wherein identifying network activity comprises:
    including a tracking pixel with the particular candidate content item; and
    receiving visibility information from the client computing device based on a firing of the tracking pixel at the client computing device.

18. The non-transitory computer readable storage medium of claim 13, wherein identifying network activity comprises:
    including a cookie with the delivered particular candidate content item; and
    detecting the cookie on the client computing device during subsequent computer network activity.

* * * * *